United States Patent
Daniel-Wayman et al.

(10) Patent No.: US 9,396,598 B2
(45) Date of Patent: Jul. 19, 2016

(54) REMOTE GUEST ACCESS TO A SECURED PREMISES

(71) Applicant: The Chamberlain Group, Inc., Elmhurst, IL (US)

(72) Inventors: Robert Daniel-Wayman, Lombard, IL (US); James Scott Murray, Glendale Heights, IL (US); Cory Jon Sorice, LaGrange, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 14/525,924

(22) Filed: Oct. 28, 2014

(65) Prior Publication Data
US 2016/0117874 A1    Apr. 28, 2016

(51) Int. Cl.
*G07C 9/00* (2006.01)
*H04W 4/02* (2009.01)

(52) U.S. Cl.
CPC ........ *G07C 9/00111* (2013.01); *G07C 9/00039* (2013.01); *G07C 9/00103* (2013.01); *G07C 9/00182* (2013.01); *G07C 9/00309* (2013.01);
(Continued)

(58) Field of Classification Search
CPC ........... G07C 9/00571; G07C 9/00857; G07C 9/00904; G07C 9/00896; G07C 9/00103; G07C 9/00039; G07C 9/00309; G07C 9/00111; G07C 9/00182; G07C 2209/04; G07C 2209/03; G07C 2009/00793; G07C 2009/00928; G08C 17/02
USPC ................. 340/5.6, 5.7, 5.73, 5.61, 5.54, 5.2; 49/357
See application file for complete search history.

(56) References Cited

U.S. PATENT DOCUMENTS

| 1,406,850 A | 11/1849 | Pone |
| 2,980,827 A | 4/1961 | Hill |
| 3,536,836 A | 10/1970 | Pfeiffer |

(Continued)

FOREIGN PATENT DOCUMENTS

| AU | 2013254889 | 5/2014 |
| CA | 2831589 | 5/2014 |

(Continued)

OTHER PUBLICATIONS

"Now You Can Close Your Garage Door With a Smartphone;" Copyright 2011 USA Today; http://content.usatoday.com/communities/driveon/post/2011/09/now-you-can-control-your-garage-door-from-your-smartphone.

(Continued)

*Primary Examiner* — Ali Neyzari
(74) *Attorney, Agent, or Firm* — Fitch Even Tabin & Flannery LLP

(57) ABSTRACT

Application software for a mobile utilizes a functionality of the mobile device to determine a location and determine whether the location is within a predetermined area surrounding an access control device that controls access to the secured premises. In response to determining that the mobile device is located within the predetermined area, the application software can display identification information for owners or tenants of the secured premises. Upon receipt of a selection received from a user input of the mobile device, the mobile device can communicate with a device of the owner over any suitable communication network in order to be granted access to the secured premises by operation of the access control device.

26 Claims, 14 Drawing Sheets

(52) U.S. Cl.
CPC .. *G07C 9/00571* (2013.01); *G07C 2009/00769* (2013.01); *H04W 4/02* (2013.01)

(56) References Cited

U.S. PATENT DOCUMENTS

| | | | |
|---|---|---|---|
| 4,325,146 A | 4/1982 | Lennington |
| 4,360,801 A | 11/1982 | Duhame |
| 4,408,251 A | 10/1983 | Kaplan |
| 4,464,651 A | 8/1984 | Duhame |
| 4,533,905 A | 8/1985 | Leivenzon |
| 4,573,046 A | 2/1986 | Pinnow |
| 4,583,081 A | 4/1986 | Schmitz |
| 4,629,874 A | 12/1986 | Pugsley |
| 4,821,024 A | 4/1989 | Bayha |
| 4,881,148 A | 11/1989 | Lambropoulos |
| 4,922,224 A | 5/1990 | Drori |
| 4,987,402 A | 1/1991 | Nykerk |
| 5,003,293 A | 3/1991 | Wu |
| 5,047,928 A | 9/1991 | Wiedemer |
| 5,155,680 A | 10/1992 | Wiedemer |
| 5,191,268 A | 3/1993 | Duhame |
| 5,247,440 A | 9/1993 | Capurka |
| 5,255,341 A | 10/1993 | Nakajima |
| 5,278,832 A | 1/1994 | Binzel |
| 5,280,527 A | 1/1994 | Gullman |
| 5,283,549 A | 2/1994 | Mehaffey |
| 5,402,105 A | 3/1995 | Doyle |
| 5,444,440 A | 8/1995 | Heydendahl |
| 5,473,318 A | 12/1995 | Martel |
| 5,475,377 A | 12/1995 | Lee |
| 5,541,585 A | 7/1996 | Duhame |
| 5,565,843 A | 10/1996 | Meyvis |
| 5,565,857 A | 10/1996 | Lee |
| 5,596,840 A | 1/1997 | Teich |
| 5,608,778 A | 3/1997 | Partridge, III |
| 5,656,900 A | 8/1997 | Michel |
| 5,689,236 A | 11/1997 | Kister |
| 5,731,756 A | 3/1998 | Roddy |
| 5,780,987 A | 7/1998 | Fitzgibbon |
| 5,781,107 A | 7/1998 | Ji |
| 5,805,064 A | 9/1998 | Yorkey |
| 5,805,082 A | 9/1998 | Hassett |
| 5,883,579 A | 3/1999 | Schreiner |
| 5,886,634 A | 3/1999 | Muhme |
| 5,917,405 A | 6/1999 | Joao |
| 5,940,000 A | 8/1999 | Dykema |
| 5,969,637 A | 10/1999 | Doppelt |
| 5,990,828 A | 11/1999 | King |
| 6,002,332 A | 12/1999 | King |
| 6,011,468 A | 1/2000 | Lee |
| 6,026,165 A | 2/2000 | Marino |
| 6,028,537 A | 2/2000 | Suman |
| 6,070,361 A | 6/2000 | Paterno |
| 6,127,740 A | 10/2000 | Roddy |
| 6,131,019 A | 10/2000 | King |
| 6,154,544 A | 11/2000 | Farris |
| 6,161,005 A | 12/2000 | Pinzon |
| 6,166,634 A | 12/2000 | Dean |
| 6,184,641 B1 | 2/2001 | Crimmins |
| 6,192,282 B1 | 2/2001 | Smith |
| 6,223,029 B1 | 4/2001 | Stenman |
| 6,225,903 B1 | 5/2001 | Soloway |
| 6,266,540 B1 | 7/2001 | Edgar, III |
| 6,271,765 B1 | 8/2001 | King |
| 6,278,249 B1 | 8/2001 | Fitzgibbon |
| 6,310,548 B1 | 10/2001 | Stephens, Jr. |
| 6,326,754 B1 | 12/2001 | Mullet |
| 6,346,889 B1 | 2/2002 | Moss |
| 6,356,868 B1 | 3/2002 | Yuschik |
| 6,388,559 B1 | 5/2002 | Cohen |
| 6,400,265 B1 | 6/2002 | Saylor |
| 6,404,337 B1 | 6/2002 | Van |
| RE37,784 E | 7/2002 | Fitzgibbon |
| 6,427,913 B1 | 8/2002 | Maloney |
| 6,434,158 B1 | 8/2002 | Harris |
| 6,434,408 B1 | 8/2002 | Heckel |
| 6,448,894 B1 | 9/2002 | Desai |
| 6,476,708 B1 | 11/2002 | Johnson |
| 6,476,732 B1 | 11/2002 | Stephan |
| 6,484,784 B1 | 11/2002 | Weik, III |
| 6,525,645 B2 | 2/2003 | King |
| 6,553,238 B1 | 4/2003 | Ginzel |
| 6,553,881 B2 | 4/2003 | Marmin |
| 6,561,255 B1 | 5/2003 | Mullet |
| 6,563,430 B1 | 5/2003 | Kemink |
| 6,564,056 B1 | 5/2003 | Fitzgerald |
| 6,597,291 B2 | 7/2003 | Tsui |
| 6,616,034 B2 | 9/2003 | Wu |
| 6,634,408 B2 | 10/2003 | Mays |
| 6,661,340 B1 | 12/2003 | Saylor et al. |
| 6,686,838 B1 | 2/2004 | Rezvani |
| 6,717,528 B1 | 4/2004 | Burleson |
| 6,781,516 B2 | 8/2004 | Reynard |
| 6,782,662 B2 | 8/2004 | McCartney |
| 6,792,083 B2 | 9/2004 | Dams |
| 6,803,851 B1 | 10/2004 | Kramer |
| 6,803,882 B2 | 10/2004 | Hoetzel |
| 6,812,849 B1 | 11/2004 | Ancel |
| 6,822,603 B1 | 11/2004 | Crimmins |
| 6,823,188 B1 | 11/2004 | Stern |
| 6,833,681 B2 | 12/2004 | Fitzgibbon |
| 6,850,163 B1 | 2/2005 | Adamczyk |
| 6,891,838 B1 | 5/2005 | Petite |
| 6,903,650 B2 | 6/2005 | Murray |
| 6,919,790 B2 | 7/2005 | Kanazawa |
| 6,924,727 B2 | 8/2005 | Nagaoka |
| 6,933,843 B1 | 8/2005 | Hom |
| 6,960,998 B2 | 11/2005 | Menard |
| 6,975,202 B1 | 12/2005 | Rodriguez |
| 6,975,226 B2 | 12/2005 | Reynard |
| 6,980,117 B1 | 12/2005 | Kirkland |
| 6,980,131 B1 | 12/2005 | Taylor |
| 6,989,760 B2 | 1/2006 | Dierking |
| 6,998,977 B2 | 2/2006 | Gregori |
| 7,038,409 B1 | 5/2006 | Mullet |
| 7,057,494 B2 | 6/2006 | Fitzgibbon |
| 7,071,813 B2 | 7/2006 | Fitzgibbon |
| 7,071,850 B1 | 7/2006 | Fitzgibbon |
| 7,091,688 B2 | 8/2006 | Gioia |
| 7,124,943 B2 | 10/2006 | Quan |
| 7,127,847 B2 | 10/2006 | Fitzgibbon |
| 7,142,849 B2 | 11/2006 | Neuman |
| 7,158,007 B2 | 1/2007 | Kawamoto |
| 7,161,319 B2 | 1/2007 | Ergun |
| 7,161,466 B2 | 1/2007 | Chuey |
| 7,167,076 B2 | 1/2007 | Wilson |
| 7,170,998 B2 | 1/2007 | McLintock |
| 7,190,266 B2 | 3/2007 | Mullet |
| 7,192,278 B2 | 3/2007 | Cao |
| 7,197,278 B2 | 3/2007 | Harwood |
| 7,205,908 B2 | 4/2007 | Tsui |
| 7,207,142 B2 | 4/2007 | Mullet |
| 7,221,289 B2 | 5/2007 | Hom |
| 7,227,444 B2 | 6/2007 | Fitzgibbon |
| 7,262,683 B2 | 8/2007 | Maeda |
| 7,266,344 B2 | 9/2007 | Rodriguez |
| 7,269,416 B2 | 9/2007 | Guthrie |
| 7,274,300 B2 | 9/2007 | Duvernell |
| 7,289,014 B2 | 10/2007 | Mullet |
| 7,298,240 B2 | 11/2007 | Lamar |
| 7,306,145 B2 | 12/2007 | Sakai |
| 7,310,043 B2 | 12/2007 | Mamaloukas |
| 7,323,991 B1 | 1/2008 | Eckert |
| 7,331,144 B2 | 2/2008 | Parsadayan |
| 7,332,999 B2 | 2/2008 | Fitzgibbon |
| 7,365,634 B2 | 4/2008 | Brookbank |
| 7,370,074 B2 | 5/2008 | Alexander |
| 7,380,375 B2 | 6/2008 | Maly |
| 7,392,944 B2 | 7/2008 | Shieh |
| 7,424,733 B2 | 9/2008 | Kamiwada |
| 7,446,644 B2 | 11/2008 | Schaffzin |
| 7,464,403 B2 | 12/2008 | Hardman, Jr. |
| 7,468,676 B2 | 12/2008 | Styers |

(56) References Cited

U.S. PATENT DOCUMENTS

| | | | |
|---|---|---|---|
| 7,471,199 B2 * | 12/2008 | Zimmerman | G07C 9/00031 340/10.1 |
| 7,482,923 B2 | 1/2009 | Fitzgibbon | |
| 7,493,726 B2 | 2/2009 | Fitzgibbon | |
| 7,498,936 B2 | 3/2009 | Maeng | |
| 7,532,965 B2 | 5/2009 | Robillard | |
| 7,561,075 B2 | 7/2009 | Fitzgibbon | |
| 7,600,550 B2 | 10/2009 | Mays | |
| 7,616,090 B2 | 11/2009 | Baker | |
| 7,708,048 B2 | 5/2010 | Mays | |
| 7,724,687 B2 | 5/2010 | Autret | |
| 7,741,951 B2 | 6/2010 | Fitzgibbon | |
| 7,761,186 B2 | 7/2010 | Keller | |
| 7,778,604 B2 | 8/2010 | Bauman | |
| 7,783,018 B1 | 8/2010 | Goldberg | |
| 7,852,212 B2 | 12/2010 | Fitzgibbon | |
| 7,853,221 B2 | 12/2010 | Rodriguez | |
| 7,856,558 B2 | 12/2010 | Martin | |
| 7,876,218 B2 | 1/2011 | Fitzgibbon | |
| 7,983,160 B2 | 7/2011 | Gunatilake | |
| 7,983,180 B2 | 7/2011 | Harrington | |
| 7,994,896 B2 | 8/2011 | Fitzgibbon | |
| 7,995,460 B2 | 8/2011 | Edgar, III | |
| 8,014,528 B2 | 9/2011 | Bunte | |
| 8,040,217 B2 | 10/2011 | Fitzgibbon | |
| 8,063,592 B2 | 11/2011 | Shier | |
| 8,144,011 B2 | 3/2012 | Fitzgibbon | |
| 8,175,591 B2 | 5/2012 | Fitzgibbon | |
| 8,207,818 B2 | 6/2012 | Keller, Jr. | |
| 8,239,481 B2 | 8/2012 | Alexander | |
| 8,290,515 B2 | 10/2012 | Staton | |
| 8,368,509 B2 | 2/2013 | Fitzgibbon | |
| 8,416,054 B2 | 4/2013 | Fitzgibbon | |
| 8,421,591 B2 | 4/2013 | Karasek | |
| 8,423,788 B2 | 4/2013 | Holtzman | |
| 8,544,523 B2 | 10/2013 | Mays | |
| 8,561,348 B2 | 10/2013 | Kurth | |
| 8,577,392 B1 | 11/2013 | Pai | |
| 8,587,404 B2 | 11/2013 | Laird | |
| 8,643,465 B2 | 2/2014 | Fitzgibbon | |
| 8,797,138 B2 | 8/2014 | Myers | |
| 8,868,220 B2 | 10/2014 | Crucs | |
| 2001/0011941 A1 | 8/2001 | King | |
| 2001/0017483 A1 | 8/2001 | Frohberg | |
| 2002/0014954 A1 | 2/2002 | Fitzgibbon | |
| 2002/0033760 A1 | 3/2002 | Kobayashi | |
| 2002/0067308 A1 | 6/2002 | Robertson | |
| 2002/0162175 A1 | 11/2002 | Berglund | |
| 2002/0178385 A1 | 11/2002 | Dent | |
| 2002/0180582 A1 | 12/2002 | Nielsen | |
| 2002/0180600 A1 | 12/2002 | Kirkland | |
| 2002/0183008 A1 | 12/2002 | Menard | |
| 2003/0016119 A1 | 1/2003 | Teich | |
| 2003/0016139 A1 | 1/2003 | Teich | |
| 2003/0018478 A1 | 1/2003 | Mays | |
| 2003/0023881 A1 | 1/2003 | Fitzgibbon | |
| 2003/0029579 A1 | 2/2003 | Mays | |
| 2003/0043021 A1 | 3/2003 | Chung | |
| 2003/0097586 A1 | 5/2003 | Mok | |
| 2003/0098778 A1 | 5/2003 | Taylor | |
| 2003/0118187 A1 | 6/2003 | Fitzgibbon | |
| 2003/0151493 A1 | 8/2003 | Straumann | |
| 2003/0182132 A1 | 9/2003 | Niemoeller | |
| 2003/0193388 A1 | 10/2003 | Ghabra | |
| 2003/0216139 A1 | 11/2003 | Olson | |
| 2003/0222754 A1 | 12/2003 | Cho | |
| 2004/0012481 A1 | 1/2004 | Brusseaux | |
| 2004/0012483 A1 | 1/2004 | Mays | |
| 2004/0036573 A1 | 2/2004 | Fitzgibbon | |
| 2004/0176107 A1 | 9/2004 | Chadha | |
| 2004/0212498 A1 | 10/2004 | Peterson | |
| 2004/0239482 A1 | 12/2004 | Fitzgibbon | |
| 2004/0257189 A1 | 12/2004 | Chang | |
| 2004/0257199 A1 | 12/2004 | Fitzgibbon | |
| 2005/0012631 A1 | 1/2005 | Gregori | |
| 2005/0030179 A1 | 2/2005 | Script | |
| 2005/0033641 A1 | 2/2005 | Jha | |
| 2005/0035873 A1 | 2/2005 | Kimura | |
| 2005/0044906 A1 | 3/2005 | Spielman | |
| 2005/0076242 A1 | 4/2005 | Breuer | |
| 2005/0085248 A1 | 4/2005 | Bailay | |
| 2005/0088281 A1 | 4/2005 | Rohrberg | |
| 2005/0099299 A1 | 5/2005 | Tyroler | |
| 2005/0110639 A1 | 5/2005 | Puzio | |
| 2005/0113080 A1 | 5/2005 | Nishimura | |
| 2005/0134426 A1 | 6/2005 | Mullet | |
| 2005/0146417 A1 | 7/2005 | Sweatte | |
| 2005/0170777 A1 | 8/2005 | Harwood | |
| 2005/0174250 A1 | 8/2005 | Dierking | |
| 2005/0195066 A1 | 9/2005 | Vandrunen | |
| 2005/0206497 A1 | 9/2005 | Tsui | |
| 2005/0242923 A1 | 11/2005 | Pearson | |
| 2005/0245233 A1 | 11/2005 | Anderson | |
| 2005/0258937 A1 | 11/2005 | Neuwirth | |
| 2005/0272372 A1 | 12/2005 | Rodriguez | |
| 2005/0273372 A1 | 12/2005 | Bowne | |
| 2006/0038656 A1 | 2/2006 | Wilson | |
| 2006/0056663 A1 | 3/2006 | Call | |
| 2006/0077035 A1 | 4/2006 | Mamaloukas | |
| 2006/0091998 A1 | 5/2006 | Fitzgibbon | |
| 2006/0103503 A1 | 5/2006 | Rodriguez | |
| 2006/0132284 A1 | 6/2006 | Murphy | |
| 2006/0137261 A1 | 6/2006 | Maly | |
| 2006/0145811 A1 | 7/2006 | Nantz | |
| 2006/0147052 A1 | 7/2006 | Wikel | |
| 2006/0153122 A1 | 7/2006 | Hinman | |
| 2006/0158344 A1 | 7/2006 | Bambini | |
| 2006/0164208 A1 | 7/2006 | Schaffzin | |
| 2006/0187034 A1 | 8/2006 | Styers | |
| 2006/0214783 A1 | 9/2006 | Ratnakar | |
| 2006/0220785 A1 | 10/2006 | Ferdman | |
| 2006/0223518 A1 | 10/2006 | Haney | |
| 2006/0261932 A1 | 11/2006 | Ando | |
| 2006/0279399 A1 | 12/2006 | Chuey | |
| 2007/0005605 A1 | 1/2007 | Hampton | |
| 2007/0005806 A1 | 1/2007 | Fitzgibbon | |
| 2007/0028339 A1 | 2/2007 | Carlson | |
| 2007/0046428 A1 | 3/2007 | Mamaloukas | |
| 2007/0058811 A1 | 3/2007 | Fitzgibbon | |
| 2007/0116194 A1 | 5/2007 | Agapi | |
| 2007/0146118 A1 | 6/2007 | Rodriguez | |
| 2007/0159301 A1 | 7/2007 | Hirt | |
| 2007/0171046 A1 | 7/2007 | Diem | |
| 2007/0177740 A1 | 8/2007 | Nakajima | |
| 2007/0183597 A1 | 8/2007 | Bellwood | |
| 2007/0185597 A1 | 8/2007 | Bejean | |
| 2007/0290792 A1 | 12/2007 | Tsuchimochi | |
| 2008/0061926 A1 | 3/2008 | Strait | |
| 2008/0092443 A1 | 4/2008 | Herman | |
| 2008/0106370 A1 | 5/2008 | Perez | |
| 2008/0108301 A1 | 5/2008 | Dorenbosch | |
| 2008/0130791 A1 | 6/2008 | Fitzgibbon | |
| 2008/0132220 A1 | 6/2008 | Fitzgibbon | |
| 2008/0224886 A1 | 9/2008 | Rodriguez et al. | |
| 2008/0303706 A1 | 12/2008 | Keller | |
| 2009/0005080 A1 | 1/2009 | Forstall | |
| 2009/0063293 A1 | 3/2009 | Mirrashidi | |
| 2009/0064056 A1 | 3/2009 | Anderson | |
| 2009/0102651 A1 | 4/2009 | Fitzgibbon | |
| 2009/0160637 A1 | 6/2009 | Maeng | |
| 2009/0273438 A1 | 11/2009 | Sultan | |
| 2009/0302997 A1 | 12/2009 | Bronstein | |
| 2009/0315751 A1 | 12/2009 | Bennie | |
| 2010/0120450 A1 | 5/2010 | Herz | |
| 2010/0141381 A1 | 6/2010 | Bliding | |
| 2010/0141514 A1 | 6/2010 | Bell | |
| 2010/0242360 A1 | 9/2010 | Dyas | |
| 2010/0242369 A1 | 9/2010 | Laird | |
| 2010/0289661 A1 | 11/2010 | Styers | |
| 2010/0297941 A1 | 11/2010 | Doan | |
| 2010/0299517 A1 | 11/2010 | Jukic | |
| 2011/0025456 A1 | 2/2011 | Bos | |
| 2011/0032073 A1 | 2/2011 | Mullet | |
| 2011/0055909 A1 | 3/2011 | Dowlatkhah | |

(56) References Cited

U.S. PATENT DOCUMENTS

| | | | |
|---|---|---|---|
| 2011/0084798 A1 | 4/2011 | Fitzgibbon | |
| 2011/0109426 A1 | 5/2011 | Harel | |
| 2011/0130134 A1 | 6/2011 | VanRysselberghe | |
| 2011/0193700 A1 | 8/2011 | Fitzgibbon | |
| 2011/0205013 A1 | 8/2011 | Karasek | |
| 2011/0234367 A1 | 9/2011 | Murphy | |
| 2011/0254685 A1 | 10/2011 | Karasek | |
| 2011/0258076 A1 | 10/2011 | Muirbrook | |
| 2011/0311052 A1 | 12/2011 | Myers | |
| 2011/0316667 A1 | 12/2011 | Tran | |
| 2012/0098638 A1 | 4/2012 | Crawford | |
| 2012/0188054 A1 | 7/2012 | Bongard | |
| 2012/0249289 A1 | 10/2012 | Freese | |
| 2012/0280783 A1 | 11/2012 | Gerhardt | |
| 2012/0280789 A1 | 11/2012 | Gerhardt | |
| 2012/0280790 A1 | 11/2012 | Gerhardt | |
| 2013/0057695 A1 | 3/2013 | Huisking | |
| 2013/0060357 A1 | 3/2013 | Li | |
| 2013/0060358 A1 | 3/2013 | Li | |
| 2013/0093563 A1 | 4/2013 | Adolfsson | |
| 2013/0147600 A1 | 6/2013 | Murray | |
| 2013/0151977 A1 | 6/2013 | Arteaga-King | |
| 2013/0257589 A1* | 10/2013 | Mohiuddin | G08C 17/02 340/5.61 |
| 2013/0290191 A1 | 10/2013 | Dischamp | |
| 2013/0328663 A1 | 12/2013 | Ordaz | |
| 2014/0021087 A1 | 1/2014 | Adler | |
| 2014/0125499 A1 | 5/2014 | Cate | |
| 2014/0184393 A1 | 7/2014 | Witkowski | |
| 2014/0253285 A1* | 9/2014 | Menzel | G07C 9/00 340/5.7 |
| 2014/0266573 A1 | 9/2014 | Sullivan | |
| 2015/0221147 A1* | 8/2015 | Daniel-Wayman | G07C 9/00039 340/5.54 |
| 2016/0010382 A1 | 1/2016 | Cate | |

FOREIGN PATENT DOCUMENTS

| | | |
|---|---|---|
| DE | 19801119 C1 | 9/1999 |
| EP | 0422190 | 10/1990 |
| EP | 846991 | 11/1997 |
| EP | 0913979 A2 | 5/1999 |
| EP | 1151598 | 6/2000 |
| EP | 1227027 | 7/2002 |
| GB | 2404765 | 2/2005 |
| JP | 2002019548 | 1/2002 |
| JP | 2004088774 | 3/2004 |
| JP | 4864457 | 2/2012 |
| KR | 2002032461 | 5/2002 |
| WO | 9012411 | 10/1990 |
| WO | 9515663 A1 | 6/1995 |
| WO | 9923614 | 5/1999 |
| WO | 0036812 | 6/2000 |
| WO | 0193220 | 12/2001 |
| WO | 02075542 | 9/2002 |
| WO | 2009088901 | 7/2009 |
| WO | 2011055128 | 5/2011 |

OTHER PUBLICATIONS

4Sight Internet Brochure; http://4sightsolution.4frontes.com/document/4CB-4S00-0809; Carrollton, TX; 2009; 5 pgs.

4th Usenix; Windows Systems Symposium; Seattle, Washington USA; Aug. 3-4, 2000; A Toolkit for Building Dependable and Extensible Home Networking Applications; Yi-Min Wang, Wilf Russell and Anish Arora.

6POWER, IPv6 and PLC for home automation; Terena 2004; Jordi Palet & Francisco Ortiz.

828LM—LiftMaster Internet Gateway; http://www.liftmastercom/consumerweb/pages/accessoriesmodeldetaiLaspx? modelId=2407; printed Oct. 30, 2012.

ActieHome PC Home Automation System; http://www.x10.com/promotions/sw31a_activehome_hmp.html?WENTY11; accessed Sep. 2011.

Arrayent; White Paper: Six System Requirements for an Internet-Connected Product Line; Copyright 2010; http://arrayent.com/pdfs/SixSystemRequirementsforInternetConnectedProductsLine.pdf.

Authentication vs. Encryption; Be in Control with Control Networks; Feb. 10, 2004; http://www.buildings.com/DesktcpModulesIBB ArlicleMaxfArticleDeta l/BBArticleDetai lPrintaspx7ArlicleID=1740& Template=standm-d_Pri nt.ascx &siteID= 1.

Automatic Garage Door Closer Manual—Protectrix 18A—Dated Mar. 31, 2009.

Big blue builds home network technology; McCune, Heather; http://search.proquest.com/docview/194229104?accountid=12492; Apr. 2003.

Bill Peisel; "Designing the Next Step in Internet Applicances" Electronic Design/Mar. 23, 1998.

Canadian Patent Application No. 2,533,795; Office Action Dated Jan. 9, 2015.

Canadian Patent Application No. 2,533,795; Second Office Action Dated Dec. 30, 2013.

Combined Search and Examination Report Cited in British Patent Application No. GB1025649.5 Dated Aug. 8, 2012.

Controlling the Status Indicator Module of the Stanley Garage Door Opener Set; Rene Braeckman; Apr. 6, 2000.

Defendant's Motion to Dismiss Second Amended Complaint Due to Patent Invalidity Under 35 U.S.C. § 101; NDIL Case 14-cv-05197; Mar. 17, 2015.

Defendant Invalidity Contentions regarding U.S. Pat. No. 6,998,977, Exhibit 16, Apr. 20, 2015.

Defendant Invalidity Contentions regarding U.S. Pat. No. 7,482,923, Exhibit 20, Apr. 20, 2015.

Defendant Invalidity Contentions regarding U.S. Pat. No. 7,852,212, Exhibit 18, Apr. 20, 2015.

Defendant Invalidity Contentions regarding U.S. Pat. No. 7,876,218, Exhibit 19, Apr. 20, 2015.

Defendant Invalidity Contentions regarding U.S. Pat. No. 8,144,011, Exhibit 17, Apr. 20, 2015.

Detroit Free Press Home Computing Column; Detroit Free; Newman, Heather; http ://search.proquest.com/docview/4632707 4 7?accountid=12492; Knight Ridder/Tribune Business News; © 2002, last updated Dec. 13, 2011.

Diomidis D. Spinellis; The information furnace: consolidated home control; Received: Jun. 1, 2002 / Accepted: Aug. 14, 2002; © Springer-Verlag London Limited 2003.

Doug Olenick; Motorola Broadens Home Automation Line; http ://search.proquest.com/docview/232255560?accountid=12492; vol. 20, © Jan. 6, 2005; last updated Sep. 1, 2011.

Examination Report from New Zealand Patent Application No. 599055 dated Apr. 3, 2012.

Examination Report Under Section 18(3) Cited in British Patent Application No. GB1205649.5 Dated May 29, 2013.

Examination Report Under Section 18(3) for GB1205649.5 Dated Feb. 12, 2014.

Examination Report Under Section 18(3) for GB1205649.5 Dated Jun. 11, 2014.

EZSrve-Insteon/X10 Home Automation Gateway—Model #5010L; hap://www.simplehomenet.com/proddetail.asp?prod+9357342317, accessed Sep. 2011.

First Office Action mailed Aug. 8, 2014 in related U.S. Appl. No. 13/671,602.

Fully-Loaded ActiveHome Pro PC Hom Automation System; http://www.x10.com/promotions/cm15a_loaded_ps.html ; accessed Sep. 2011.

George Lawton; "Dawn of the Internet Appliance" Computer, Industry Trends; Oct. 1, 1997.

Hassan A. Artail; "A Distributed System of Network-Enabled Microcontrollers for Controlling and Monitoring Home Devices" IEEE 2002.

Hawking Technologies HomeRemote Wireless Home Automation Gateway Pro Starter Kit; The HRGZ2 HomeRemote Gateway; Smart Home Systems, Inc.; http://www.smarthomeusa.com/ShopByManufacturer/Hawking-Technologies/Item/HRPS1/; Accessed Sep. 2011.

(56) References Cited

OTHER PUBLICATIONS

HomeRemote Wireless Home Automation Gateway—PracticallyNetworked.com; Review date Aug. 2007; http://222.practicallynetworked.com/review.asp?pid=690; Accessed Sep. 2011.
HomeSeer HS2—Home Automation Software; http://store.homeseer.com/store/HomeSeer-HS2-Home-Automation-Software-Download-P103.aspx; Accessed Sep. 2011.
How to Internet-Connect Your Low Cost Consumer Retail Embedded Design; How to Prototype an Internet Connect Product; Hershy Wanigasekara; Sep. 13, 2010; http://www.eetimes.com/design/embedded/4027637/Internet-Connect-your-low-cost-consumer-retail-embedded-design.
How to Internet-Connect Your Low Cost Consumer Retail Embedded Design; How to Prototype an Internet Connected Product; Hershy Wanigasekara; Sep. 13, 2010; http://www.eetimes.com/design/embedded/4027637/Internet-Connect-your-low-cost-consumer-retail-embedded-design.
How to Internet-Connect Your Low Cost Consumer Retail Embedded Design; Internet Connect Product Implementation Design Patterns; Hershy Wanigasekara; Sep. 13, 2010; http://www.eetimes.com/design/embedded/4027637/Internet-Connect-your-low-cost-consumer-retail-embedded-design.
Ian Bryant and Bill Rose; "Home Systems: Home Controls;" p. 1-322; © 2001 Parks Associates.
Infinias Mobile Credential App for Android DroidMill; Known and printed as early as Dec. 19, 2011; http://droidmill.com/infinias-mobile-credential-1364120.html.
Intelli-M eIDC32; Ethernet-Enabled Integrated Door Controller; www.infinias.com; Known and printed as early as Dec. 19, 2011.
International Conference on Sensors and Control Techniques (IeSC 2000); Desheng Jiang, Anbo Wang, Fume and Temperature Alarm and Intelligent Control System of the District for Fire-Proof, Jun. 19-21, 2000, Wuhan, China, vol. 4077.
Internet Connected Garage Door Opener; Open New Doors at Sears; http://www.sears.corri/shc/s/p_10153_12605_00930437000P?prdNo=l&blockNo=1&blockType=G1; printed Oct. 30, 2012.
K.K. Tan, Y.L. Lim and H.L. Goh; "Remote Adaptive Control and Monitoring" IEEE (c) 2002.
Kenmore Connect; http:/www.kenmore.com/shc/s/dap_10154_12604_DAP_Kenmore+Connect; 2010 Sears Brands, LLC.
Kurt Scherf, Michael Greeson and Tricia Parks; "Primary Perspectives: "E-Enabled" Home Security;" pp. 1-87; © 2003 Parks Associates.
LiftMaster; MyQ Enabled Accessory: LiftMaster Internet Gateway (Model 828); Known as of Dec. 19, 2011.
Liftmaster Debuts New Intelligence in Garage Door Openers at IDS 2011; New Generation of LiftMaster Models and Accessories Enabled by MyQ Technology; Elmhurst, IL; Jun. 7, 2011; http://www.liftmaster.com/NR/rdonlyres/0A903511-21AB-4F0A-BBCD-196D41503CF2/4305/LiftMasterUneilsMyQTechnologyIDA2011_FINAL.pdf.
LiftMaster Internet Gateway: Your Simple Solution to Home Control; http://www.liftmaster.com/consumerweb/products/IntroducingLiftMasterInternetGateway, printed Oct. 30, 2012.
Memorandum in Support of Defendant\s Motion to Dismiss Second Amended Complaint Due to Patent Invalidity Under 35 U.S.C. § 101; NDIL Case 14-cv-05197; Exhibit A; U.S. Pat. No. 6,998,977; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit B; U.S. Pat. No. 7,852,212; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit C; U.S. Pat. No. 8,144,011; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit D; U.S. Pat. No. 7,876,218; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit E; U.S. Pat. No. 7,482,923; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit F; U.S. Pat. No. 7,071,850; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit G; Dictionary of Computer and Internet Terms; Douglas Downing; Michael A. Covington and Melody Mauidin Covington; Barrons; Mar. 17, 2015.
Memorandum in Support of Defendant\s Motion to Dismiss Second Amended Complaint Due to Patent Invalidity Under 35 U.S.C. § 101; NDIL Case 14-cv-05197; Mar. 17, 2015.
MiCasa Verde.com—Vers2; http://www.micasaverde.com/vera.php; Accessed Sep. 2011.
Miele's Remote Vision Explained; http://www.miclensa.com/service/remote_vision/verify.aspx; Accessed Feb. 2012.
Net2 User Manual; Version 3; Paxton Access; "Date code: 281002".
New Zealand Application No. 706180; First Examination Report Dated Apr. 10, 2015.
Nortek Security & Control LLC's Notice of Supplemental Authority Relevant to Defendant's Motion to Dismiss Second Amended Complaint Due to Patent Invalidity Under 35 U.S.C. § 101; *Chamberlain vs. Linear LLC and Nortek Security & Control LLC*; Case No. 1:14-cv-05197; 3 pages, Dated Apr. 29, 2015.
Office Action Mailed May 19, 2013 in U.S. Appl. No. 14/010,143.
Opposition to Defendant's Motion to Dismiss Second Amended Complaint Due to Alleged Patent Invalidity Under 35 U.S.C. 101; *Chamberlain vs. Linear LLC and Nortek Security & Control LLC*; Case No. 1:14-cv-05197; 28 pages; Dated Apr. 7, 2015.
Peter M. Corcoran and Joe Desbonnet; "Browser-Style Interfaces to a Home Automation Network" Manuscript received Jun. 18, 1997, IEEE (c) 1997.
Plaintiff Chamberlain Group, Inc.'s Response to Defendant Nortek Security Control LLC's Notice of Supplemental Authority Relevant to Defendant's Motion to Disucss Second Amended Complaint Due to [Alleged] Patent Invalidity Under 35 U.S.C. § 101 ; *Chamberlain vs. Linear LLC and Nortek Security & Control LLC*; Case No. 1:14-cv-05197; 10 Pages; Dated May 12, 2015.
Press Release; Kenmore Uneils Reolutionary Technology Enabling Laundry Applicances to 'Talk' to Customer Serice Experts; PR Newswire, pNA, Aug. 4, 2010.
Protectrix Wireless automatic Garage Door Closer Timer Opener Security Accessory; http://www.closethegarage.com; printed Oct. 30, 2012.
Reply in Support of Defendant's Motion to Dismiss Second Amended Complaint due to Patent Invalidity Under 35 U.S.C. § 101; *Chamberlain vs. Linear LLC and Nortek Security & Control LLC*; Case No. 1:14-cv-05197; 21 Pages; Dated Apr. 21, 2015.
Search History; C:\APPS\EAST\workspaces\garage_door_status_indicator.wsp; p. 4, Apr. 25, 2005.
Secure Smart Homes using• Jini and UIUC Sesame; Jalal Al-Muhtadi et al.; 1063-9527/00 © 2000 IEEE.
Security System Installation Manual; Caretaker and Custom Versions; Interactive Technologies, Inc.; Issue Date May 5, 1994.
Security System Installation Manual; Caretaker and Custom Versions; Interactive Technologies, Inc.; Text No. 46-908-01 Rev. A; 1995.
Smart Networks for Control; Reza S. Raji;IEEE Spectrum Jun. 1994.
Somfy's Slick Tahoma Z-Wire and RTS Home Automatation Gateway; Thomas Ricker; posted Janaury 4, 2011; http://www.engadget.com/2011/01/04/softys-tahoma-z-wave-and-rts-home-automation-gateway/.

(56) References Cited

OTHER PUBLICATIONS

Stephen Shankland; "Need to lend your key? E-Mail it, Frauhofer says" news.cnet.com/8301-1035_3-57572338-94/need-to-lend-your-key-e-mail-it-fraunhofer-says/; pp. 1-5; CNET News, Mar. 4, 2013.
Summary of Findings From Parks Associates\ Early Reports; pp. 9-13; Apr. 15, 2013 by Parks Associates.
Susan Cotterell, Frank Vahid, Walid Najjar, and Harry Hsieh; "First Results with eBlocks: Embedded Systems Building Blocks" University of California, Rkverside pp. 168-175; Codes+ISSS'03, Oct. 1-3, 2003.
Svein Anders Tunheim; Wireless Home Automation Systems Require Low Cost and Low Power RF-IC Solutions; Wireless Home Automation Systems (rev. 1.0) May 16, 2002; p. 1 of 8.
The Craftsman Brant Announces Garage Door Opener of the Future—PR Newswire; The Sacramento Bee; http://www.sac bee.com/2011/09/27/2941742/the-craftsman-brand-announces.html; Sep. 27, 2011.
The iDorm—a Practical Deployment of Grid Technology; Anthony Pounds -Cornish, Arran Holmes; Intelligent Interactive Environments Group, University of Essex, UK; Proceedings of the 2nd IEEE/ACM International Symposium on Cluster Computing and the Grid (CCGRIO'02) 0-7695-1582-7/02 © 2002 IEEE.
The Information Furnace: Consolidated Home Control; Diomidis D. SpinellisDepartment Management Science and Technology Athens University of Economics and Business; Personal and Ubiquitous Computing archive; vol. 7 Issue 1, May 2003.
The Information Furnace: User-friendly Home Control; Diomidis D. Spinellis, Department Management Science and Technology, Athens University of Economics and Business; SANE 2002; 3rd Int'l Sys. Admin. and Networking Conf. Proc., pp. 145-175, May 2002.
The Intelli-M eIDC32; True IP Access Control; htto://www.infinias.com/main/Products/eIDCController.aspx; Known and printed as early as Dec. 19, 2011.
Towards Dependable Home Networking: An Experience Report; Yi-Min Wang, Wilf Russell, Anish Arora, JunXu, Rajesh K. Jagannathan, Apr. 18, 2000, Technical Report, MSR-TR-2000-26, Microsoft Research, Microsoft Corporation.
U.S. Office Action Dated Aug. 8, 2014 from U.S. Appl. No. 13/671,602.
U.S. Office Action Dated Sep. 24, 2014 from U.S. Appl. No. 12/971,374.
U.S. Office Action Dated Sep. 24, 2014 in U.S. Appl. No. 13/921,584.
ULStandard for Safety for Door, Drapery, Gate, Louver, and Window Operators and Systems, UL 325 Fifth Edition, Dated Jun. 7, 2002; pp. 1-186.
United States Office Action Dated Sep. 18, 2014 from U.S. Appl. No. 14/010,143.
Universal Devices—ISY-99i Series; http://www.universal-devices.com/99i.htm; Accessed Sep. 2011.
Wayne-Dalton Press Area—New Z-Wave enabled prodrive; http://www.wayne-dalton.com/newsitem98.asp; dalton.com/newsitem98.asp; Printed Oct. 13, 2011.
*Wireless Media Innovations LLC* v. *Maherterminals LLC* (2015 WL 1810378 (D.N.J.) Apr. 20, 2015) Submitted as Document #60 in *Chamberlain* vs. *Linear LLC and Nortek Security & Control LLC*; Case No. 1:14-cv-05197, 11 Pages; Apr. 29, 2015.
www.brinkshomesecurity.com/home-security-systems-and-pricing/security-equipment/security-equipment.htm as printed on Feb. 11, 2009.
Xanboo Future Product; http://www.xanboo.com/xanproducts/newproducts.htm Feb. 2002, Xanboo Inc.
Xanboo XPC280 Wireless Universal Garage Door Control—Smarthome; http://www.smarthome.comf75066/Xanboo-XPC280-Wireless-Universal-Garage-Door-Control/p.aspx, printed Oct. 30, 2012.
XPress Access; Simple Personal Management; © 2001 Andover Controls Corporation BR-XPACCESS-A.
British Combined Search and Examination Report Under Section 17 and 18(3) from British Application No. GB0713690.6 Dated Oct. 17, 2007.
British Search Report Under Section 17 Dated Dec. 20, 2007 for Application No. GB0713690.6.
European Patent Application No. EP 1 280 109 A3; European Search Report Dated: Aug. 1, 2005.
International Search Report and Written Opinion for PCT/US2014/057405 Dated Dec. 17, 2014.
James Y. Wilson and Jason A. Kronz; Inside Bluetooth Part II, Dr. Dobb's Portal; The World of Software Development; Dr. Dobb's Journal; Jul. 22, 2001; 9 pages.
Sensory, Inc. RSC-300/364 Data Book, Jan. 2001 (55 pages).

\* cited by examiner

REMOTE GUEST ACCESS TO A SECURED PREMISES

FIELD

The present application relates to operating access control devices, and more particularly granting guest access to a secured premises via operation of access control devices.

BACKGROUND

A variety of access control devices have been developed to allow visitors access to a secured area. In one example, the secured area can be a building having one or more tenants, such as apartments, condominiums, offices, or the like. Other secured areas can include a gated community or other collection of buildings having a common secured entrance.

One type of access control device configured to grant access to such secured areas includes a housing with a display, speaker, microphone, and a dedicated telephone connection to connect a visitor with a contact person within or in control of the secured area. The display shows a list of contacts within the secured area and corresponding contact codes so that a visitor can scroll through the list to find a desired person or company. The visitor then can use the keypad on the access control device to enter the contact code to call the desired contact. The visitor can then verify his/her identity via a conversation with the desired contact, and the contact can disengage a lock on a door or other movable barrier, such as through selection of an appropriate button on the desired contact's telephone. While this type of access control device provides secure entry for both owners and guests, it is costly, requiring installation and a dedicated phone line, not to mention maintenance. Also, such systems require that the display device be fully functional at all times.

SUMMARY

Generally speaking, and pursuant to these various embodiments, a method, apparatus, mobile device application software, and computer-readable medium is provided herein that allows a guest to contact an owner or operator of a secured premises or area to gain access to the secured premises. The guest can be directed to download and install the application via a machine readable code, a communication network, a website, a display, or the like. To gain access to the secured premises, the application determines a current location of the guest device, retrieves or receives an access location area for an access control device, and compares the current location to the access location area. The guest device then receives identification information for one or more contacts within or having control over the secured premises and selects a desired contact via a user input. The application then facilitates communication between the guest and owner for the owner to identify the guest. The owner can then grant access to the guest by a suitable input to the owner device instructing the application. The application can cause the owner device to send a control signal to operate the access control device or can send access rights data to the guest device so that the guest device can send an authorized control signal to operate the access control device.

BRIEF DESCRIPTION OF THE DRAWINGS

The above needs are at least partially met through provision of the remote guest access approaches described in the following detailed description, particularly, when studied in conjunction with the drawings wherein.

Figure 1:
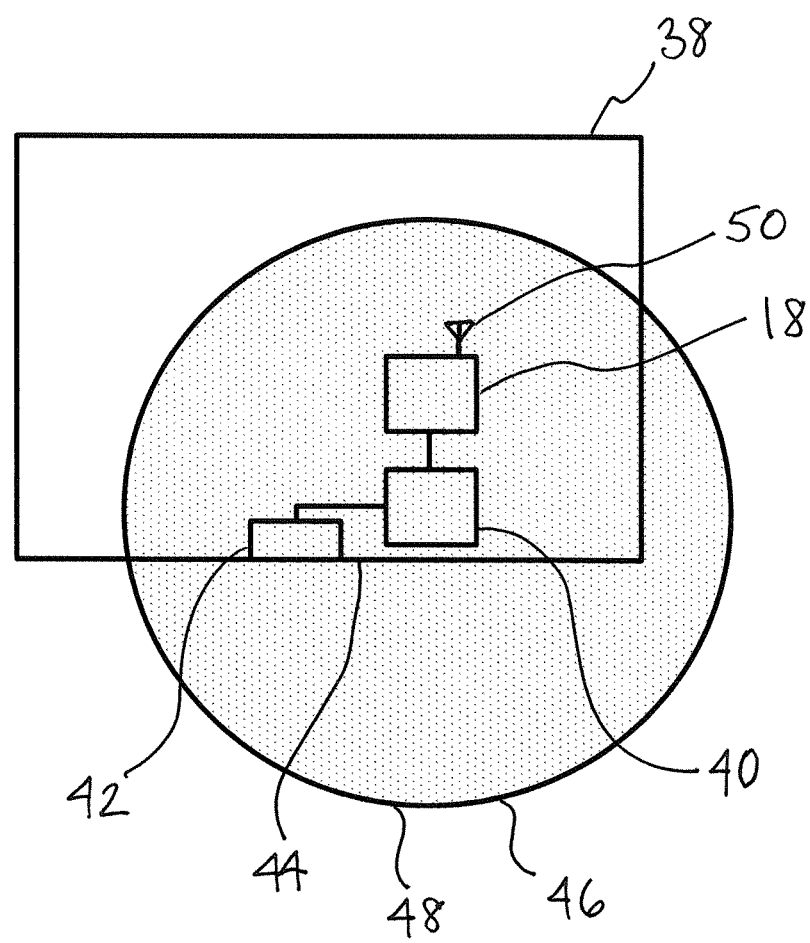
FIG. 1 is a schematic diagram showing a secured premises and an access control device configured to control an access point to the secured premises.

Skilled artisans will appreciate the elements and the figures are illustrated for simplicity and clarity and have not necessarily been drawn to scale. For example, the dimensions and/or relative positioning of some of the elements in the figures may be exaggerated relative to other elements to help improve understanding of various embodiments. Also, common but well understood elements that are useful or necessary in a commercially feasible embodiment are often not depicted to facilitate a less obstructive view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions and a person skilled in the technical field as set forth above, except where different specific meanings have otherwise been set forth herein.

DETAILED DESCRIPTION

Application software for a mobile device and/or a website hosted on one or more server devices can be utilized to gain access to a secured premises via communication with an owner or tenant of the secured premises. The application software utilizes a functionality of the guest's mobile device to determine a location and determine whether the location is within a predetermined area surrounding an access control device that controls access to the secured premises, such as through movement of a movable barrier, operation of a lock device, or the like. In response to determining that the guest's mobile device is located within the predetermined area, the application software can display identification information for owners or tenants of the secured premises. Upon receipt of a selection received from a user input of the guest's mobile device, the mobile device can communicate with a device of the owner over any suitable communication network to be granted access to the secured premises by operation of the access control device. Access can be granted via the mobile device's receiving credentials or a code to operate the access control device or the owner operating the access control device.

The following terms, which will be used throughout the disclosure herein, can have a variety of suitable meanings. For example, when used herein, an "owner" of a premises or secured area can refer to any person with the authority to authorize a guest to enter the premises or secured area. In a straightforward situation, the owner can personally own the premises, such as with a home or business, and has the authority to authorize access to a guest, such as an independent contractor, employee, customer, or personal acquaintance. The disclosure herein, however, works equally well with an example of a corporation or other business having any number of employees. In this situation, the owner would refer to a person in a position of authority, such as a CEO, president, vice-president, manager, security personnel, and the like. Without limitation, the disclosure herein can provide an owner of a premises having an access control device therein the ability to remotely grant a guest access to the premises or secured area. Similarly, "premises" can refer to a residential structure, commercial structure, industrial structure, or other secured area, or portion(s) thereof.

Details of the interacting components and structure of the system disclosed herein are shown in FIGS. 1-14. As illustrated, an owner operated communication device 10, a guest operated communication device 14, a server device 16, and an access control device 18 are capable of communication with one another through one or more communication networks 20. Suitable communication networks 20 can include, without limitation, the internet, a cellular network, Bluetooth, or other communication medium, or a combination thereof. The owner device 10 and guest device 14 can be any suitable communication device, such as a wireless communication device, including a mobile phone, tablet, computing device, E-reader, communication enabled vehicle, or the like.

Figure 3:
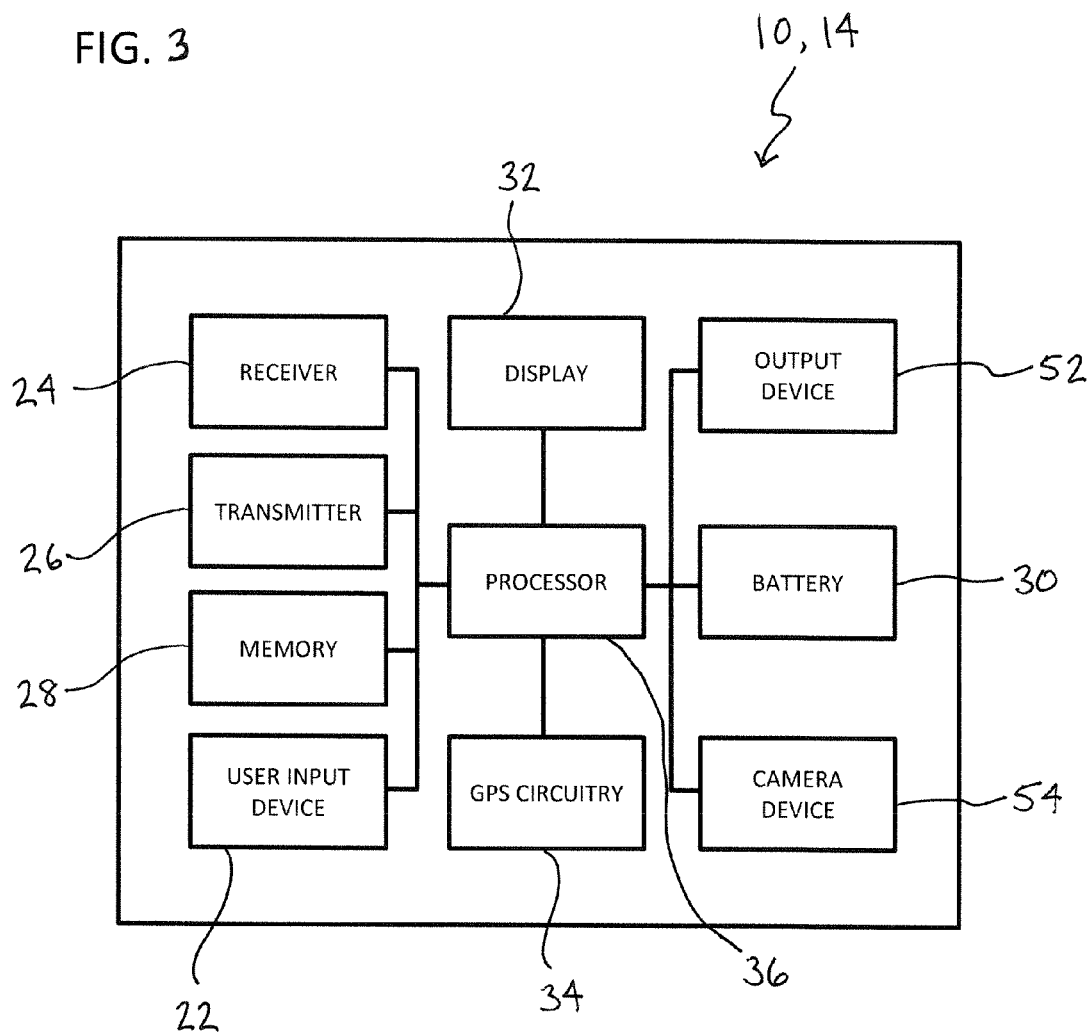
FIG. 3 is a schematic diagram of a mobile communication device.

As shown in FIG. 3, the owner device 10 and the guest device 14 each include a user input 22, such as a touch screen, keypad, switch device, voice command software, or the like, a receiver 24, a transmitter 26, a memory 28, a power source 30, which can be replaceable or rechargeable as desired, a display 32, global positioning sensor (GPS) circuitry 34, and a processing device 36 controlling the operation thereof. As commonly understood, the components are connected by electrical pathways, such as wires, traces, circuit boards, and the like.

Figure 2:
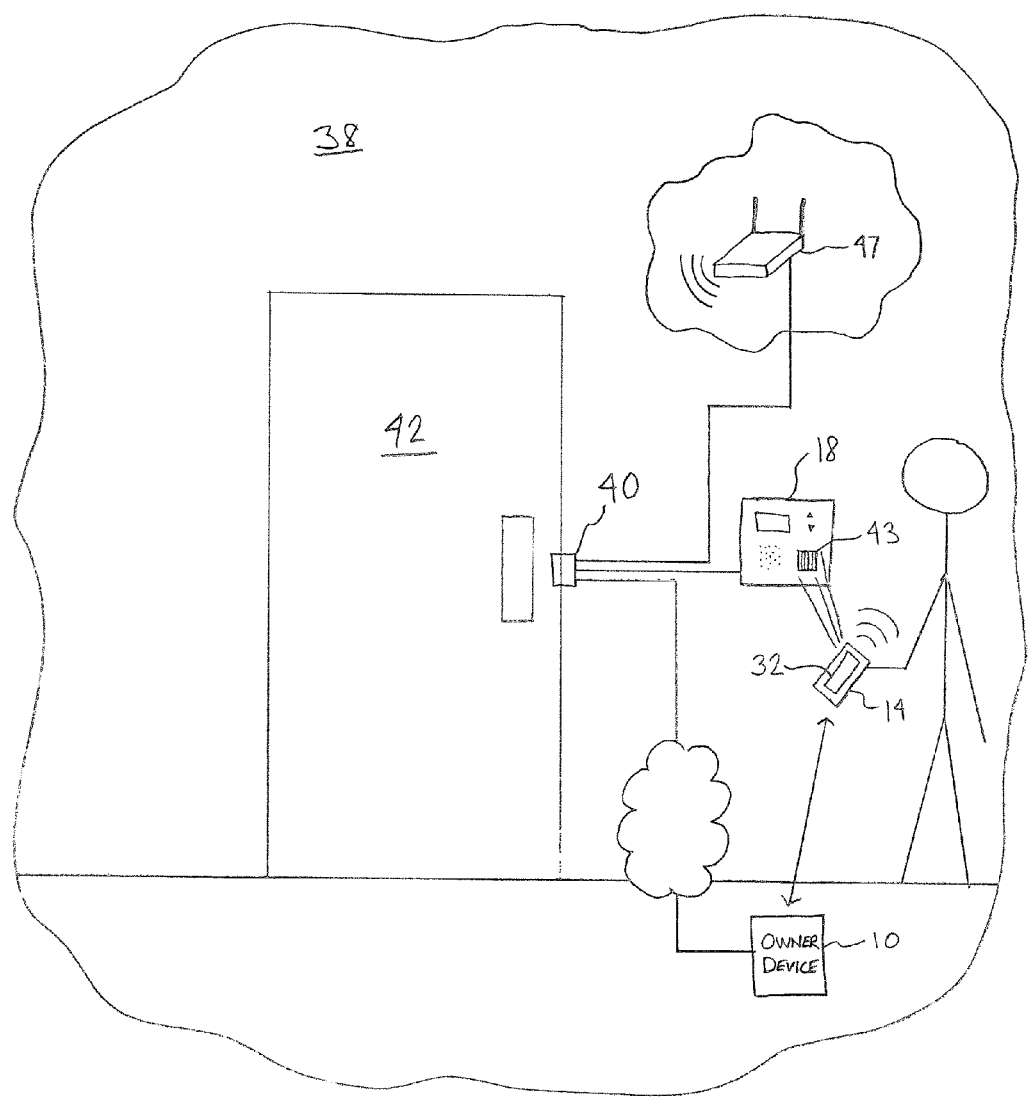
FIG. 2 is a perspective cutaway schematic diagram of an access point of a secured premises.

As shown in FIGS. 1 and 2, the access control device 18 is located in or around a secured premises or area 38. The access control device 18 is configured, upon receipt of a properly authorized control signal, to control operation of one or more secondary devices 40 in or on the premises 38. By a first approach, the access control device 18 can be part of or integrated within the secondary device 40. For example, without limitation, the secondary device 40 can refer to a movable barrier operator, such as a garage door operator, door access control, gate operator, commercial door operator, and the like, a home automation system, an alarm system, a server device, a computing device, a network device, or the like. In this approach, the access control device 18 can directly receive the control signal to open or close a movable barrier, lock or unlock one or more doors, activate or deactivate an alarm, and the like so that the guest can gain access to the secured premises via an access point 42. As described below, the location of access control device 18 will be understood to include the location of the access point 42, although they can be separated as desired or needed for various configurations.

By a second approach, the access control device 18 can be a separate gateway device capable of receiving the authorized control signal and translating the signal to a language understood by one of the specific secondary devices 40 as discussed above. For ease of description, however, all scenarios will be described as an access control device hereinafter.

The exchange of information between the guest and the owner can be facilitated via a software application ("application") installed on operating on a mobile device, such as a smart telephone, tablet, or the like although aspects of the application may be executed in a network based server or other device on or near the premises in communication with the guest device. Alternatively, or in addition thereto, the communication can be facilitated through a web site. Each configuration will be discussed herein.

As discussed in the background, the issue arises when a guest approaches the secured premises 38 and needs to be granted access by the owner. In a first instance, a machine readable code 43, such as a QR code, barcode, or the like, is positioned in a visible area 44 adjacent to an access point 42 controlled by the access control device 18. Instructions can be posted along with the machine readable code instructing the guest to scan the code with the guest device 14 for gaining access to the secured premises 38. If necessary, the instructions can also include the name of an application that can read the code or provide the requirements for reading the code. Once scanned, the guest device 14 can decode the machine readable code and display the linked content on the display 32 of the guest device 14.

The linked content can take a variety of suitable forms. In one example, the linked content can be a hyperlink that, once selected, directs the guest device 14 to a website, directory, database, or the like. The website provides the ability to download the application onto the guest device 14 and/or provide information identifying and explaining the operation of the application. Once downloaded, the application is installed on the guest device 14 to run thereon and facilitate the guest gaining access to the secured premises 38, as described in more detail below.

In another example, the linked content provides identification information for the application that can include a name, a location for downloading the application, instructions for use, associated products, and the like. As such, the guest then enters a website address or identification information for the application in a browser or online store for downloading and installation.

Alternatively, rather than the machine readable code, application identification information, such as a website address, a name of the application, or the like, can be printed or posted in the visible area adjacent to the access point.

By another approach, the guest device 14 can connect to a WiFi network 46 surrounding or adjacent to the access control device 18. The WiFi network 46 can be generated by circuitry in the access control device 18 or by a separate device 47 (which may be located inside the secured premises 38 near the access point 42) as desired. In order to instruct a guest accordingly, an SSID of the WiFi network 46 can be identified and posted within the visible area with instructions to connect the guest device 14 to the WiFi network 46. In one form, after the guest device 14 connects to the WiFi network 46, the WiFi network 46 causes a browser to automatically be directed to a website. As such, when a guest opens a browser on the guest device 14, the browser is directed to a desired website for gaining access to the secured premises.

Location determination provides a unique security function for granting a guest device 14 access to a secured premises 18. More specifically, the location determination can be performed prior to enabling the guest device 14 to contact the owner, so that the owner is not disturbed before a guest is actually present in a location where access is necessary. Additionally, the location determination prevents a guest from attempting to get an owner to disable security when the guest device is not present. The location of the guest device 14 can be determined in a variety of suitable ways, as described below.

In a first approach, location can be determined using circuitry in the guest device 14 and signals with third party devices. In one form, the guest device 14 location is determined using the GPS circuitry 34 in the guest device 14 via communication with GPS satellites. In another form, location is determined via measurements of signals at cellular towers, such as angle of approach, reception time between multiple towers, signal strength between multiple towers, or the like. Using either form, the location of the guest device 14 can be determined to a sufficient accuracy for the application to confirm that it is near the access control device 18 within an access location area 48, as described in greater detail below.

In a second approach, the application can utilize near field communication to confirm the guest device's location within the application. Near field communication utilizes a relatively small antenna set to transmit at a radio frequency that limits the size of the generated electromagnetic field 46. The signal can advantageously be modulated to transmit a signal to another antenna that is within this field. This other antenna can be a powered device or can be an unpowered chip or tag. To determine the location of the guest device 14, an antenna generating the electromagnetic field 46 can be placed near or within the access control device 18. As such, when the guest brings the guest device 14 into the electromagnetic field 46, the application can utilize the signal to confirm that the guest device 14 is located near the access control device 18. Alternatively, the guest device 14 can generate the electromagnetic field 46 to communicate with an antenna 50 located within or near the access control device.

In a third approach, the application can utilize a Bluetooth communication protocol to confirm the guest device's location. As with the earlier approach using near field communication, a Bluetooth device near or within the access control device 18 can generate a Bluetooth signal creating a field 46 surrounding or next to the access control device 18. The guest device 14 can then pair with the Bluetooth device, such as with the aid of the application, or just confirm that the Bluetooth device is within the guest device's Bluetooth signal range. In this form, the application utilizes pairing or receiving the Bluetooth signal to confirm the location of the guest device 14.

In a fourth approach, the application can utilize a WiFi network 46 to confirm the guest device's location. More specifically, a WiFi device in or near the access control device 18 generates the WiFi network 16 around or near the access control device 18. The guest device 14 then connects to the WiFi network 46 or confirms that the WiFi network 46 is within the guest device's range so that the application can confirm the guest device's presence within the access location area 48.

The access location area 48 can be set within the application by the owner and/or automatically by the application after a location of the access control device 18 are inputted into the application. By one approach, the owner operates the application on the owner device 10 in order to identify and register the access control device 18 with the application. This can be done by inputting identification information, such as registration numbers, serial numbers, or the like into the application using the user input 22 on the owner device 10. After the access control device 18 is registered, the owner then sets a desired location determination method, such as one of the options outlined above. Selection of the location determination method determines how the access location area 48 can be set. Each option will be described in turn below.

In the approach using location circuitry 34 in the guest device 14, such as GPS or signal triangulation, the owner inputs an installation location for the access control device 18. After the installation location is set, the application can optionally automatically set the access location area 48. The access location area 48 can be set as a predetermined area surrounding the access control device 18, an area outside of the secured premises 38 adjacent to the access control device 18, or the like. By a further or alternative approach, the owner can input into the application or revise a length already set in the application to set a radius for the access location area 48 surrounding the access control device 18, which in operation would create a disk-shaped access location area 48. By yet another approach, the application can utilize a map or other display of an area surrounding the access control device 18 to allow the owner to directly input the access location area 48 by drawing or highlighting a desired area. In this way, the owner can specify the access location area to only be within desirable areas, such as an area only outside the secured premises, an open area, a designated security area, or the like. This information defining the location area 48 can be stored with the application at the guest device 14 and/or in a networked storage or a storage device located at the secured premises 38.

In the approach using near field communication, the size of the broadcasting antenna determines the size of the electromagnetic field 46. In a first approach, the owner can place the broadcasting antenna 50 at a desired location in or near the access control device 18 to thereby place the electromagnetic field 46 therearound. In an alternative approach, the electromagnetic field 46 can be generated by the guest device 14. As such, an active or passive owner antenna 50 can then be placed or mounted within or near the access control device 18 so that the owner antenna receives a signal from the guest device 14 when the guest device 14 is brought close enough to the owner antenna 50. For instance, the application in the guest device 14 can transmit an identification over the near field communication to the owner device 10 or access device 18 which confirms the guest device's location within the access location area 48. Alternatively, the guest device 14 may receive a unique identification code or signal from the broadcasting antenna 50 that matches that stored in the application at the guest device 14, a network storage, or storage at the secured premises 38. In either approach, the match and confirmation that the guest device 14 is within the access location area 48 is communicated and processed prior to taking the next steps of granting access to the secured premises 38.

In the approach using Bluetooth communication, the Bluetooth generating antenna 50 can similarly be located within the access control device 18, or a Bluetooth device disposed near the access control device 18, as discussed above with respect to the near field communication approach. As such, the owner antenna 50 broadcasts a Bluetooth signal and the guest can manipulate the guest device 14 through a suitable user input 22 to pair the guest device 14 with the access control device 18. The application can facilitate this pairing via appropriate prompts on the display 32 to enter information as necessary. The application, after the guest device 14 has paired, either confirms the guest device's presence within the access location area 48 or sends the owner antenna's Bluetooth signal identification to another device to confirm the pairing. After confirmation, which effectively confirms the proximity of the guest device 14 to the access point 42, the guest device 14 begins taking the next steps of granting access to the secured premises 38 as described in greater detail below. Alternatively, the application can confirm the guest device's presence within the access location area 48 simply by determining that the Bluetooth signal can be received without fully pairing the devices and confirming that signal either locally at the guest device 14 or through communication over a network. By another approach, the Bluetooth signal can be broadcast from an antenna 26 of the guest device 14. So configured, the guest brings the guest device 14 into a suitable range to communicate with the Bluetooth antenna 50 in the access control device or separate and near thereto, whether passive or active. The application then confirms that the guest device 14 is within the access location area 48 via communication with the owner Bluetooth device 50.

As such, when the application is called on by the guest to gain access to the secured premises 38, the application automatically or manually determines a current location of the guest device 14 through the short range communication with one or more devices located at or near the access point 42 as described above. Additionally or alternatively, the application can use known mobile device location determination tools to determine the guest device's location to be compared with the access location area 48 corresponding to the access control device 18. The application can effect this comparison on the guest device 14 or by sending the guest device's location information to another device that effects the comparison to determine whether the guest device's current location is within the access location area 48. Alternatively, the application can determine whether the guest device 14 is within the access location area 48 after the guest has selected to contact an owner, set forth in more detail below.

To facilitate confirmation of the guest's identity to the owner, the guest can then be provided with a list of owners within the secured premises 38. If there are a sufficient number of owners, the application can provide a scrolling list of names or sequential pages, as desired. The owner list can be sorted, either automatically or via user input in the application, alphabetically, by location, or the like.

In one form, the list of owners maintains confidentiality by providing limited identification information for the owners. As such, one or more of the following information can be omitted from the list: location, such as floor, room number, or the like, contact information, such as telephone numbers, email addresses, usernames, or the like.

When used in a setting where there is more than one owner within the secured premises 38, the application can further provide an administrative status for editing the owner list, including adding new owners, removing owners, or editing owner information. Administrative status can be granted to a management company for the secured premises, a board of an association for the secured premises, or any of the owners, as desired. The application can preferably require a password, code, or other identification information in order to grant access to editing the owner list. When adding a new owner or editing a current owner, the owner or other administrator enter owner identification information, including name, location, and contact information for the owner device 10, so that the application can facilitate confidential communication between the guest device 14 and the owner device 10.

When a guest finds a desired owner, the guest can select the entry of the desired owner via the user input 22, such as a touch screen, button, or the like. With the selection, the application then provides a prompt asking the guest via the device display 32 whether the guest would like to contact the desired owner. This can be via a new window or screen displayed within the application, via a pop-up window, or within the original display. Alternatively, the application can automatically attempt to contact the owner after selection.

In one approach, the application sends guest information to the owner along with the contacting signal. The guest information can include a name, address, and contact information, such as one or more telephone numbers, email addresses, usernames, or the like. The guest can input the guest information into the application prior to use or can input the guest information into a prompt directed by the application prior to contacting the owner. As such, when the application contacts the owner, the owner will be presented with the guest information, which will provide the owner with information to make an entry decision and warn the owner of the identity of the guest for a subsequent conversation.

The application can initiate contact with the owner to inform the owner of the guest's presence within the access location area 48 and desire for entry into the secured premises 38 in any suitable way. In a first approach, the application causes a push notification to appear on the owner device 10 and produce an audible signal, such as a ring or tone through a speaker 52 of the owner device 10, and/or a tactile signal utilizing a vibration setting 52 of the owner device 10, as set by the owner. The push notification can be caused by any suitable message, including SMS messages, video messages, email messages, chat messages, or the like. The application can advantageously send messages confidentially so that the guest is not given contact information for the owner.

In another approach, the application calls the owner device 10 or initiates a video conference with the owner device 10 utilizing a camera device 54 and/or microphone in the guest device 14 (or otherwise mounted near the access point 42) and, if desired, a camera device 54 in the owner device 10. In the first instance, the owner confirms via a conversation with the guest the guest's identity to make an informed decision on whether to grant entry to the guest. In the second instance, seeing the guest via the video conference allows the owner to make an informed decision on whether to grant entry to the guest.

In order to be granted access to the secured premises 38, an authorized control signal is sent to the access control device 18. In one approach, the owner controls the operation of the access control device 18 via the user input 22 on the owner device 10. As such, after the owner has confirmed the identity of the guest and decides to grant access, the owner instructs the application to send the authorized control signal by selecting an appropriate input of the owner device 10 and identified by the application, which causes the owner device 10 to send the authorized control signal to the access control device 18 via any suitable communication network 20.

Alternatively, or in addition, the owner can grant access rights to the guest. In this form, the application utilizes access rights data that includes identification information of the access control device 18 and corresponding authorization information for access rights to the access control device 18. In other words, the access rights data includes credentials required by the access control device 18, a conditional requirement for allowing the credentials such as temporal restrictions, and the identification information of the access control device 18. Advantageously, the application further grants the owner the ability to send the access rights data to one or more guest devices 14. In other words, upon instruction of the owner through the application, the application can transmit the access rights data or cause the access rights data to be transmitted to the guest device 14, which then provides the guest device 14 the ability to send an authorized control signal to the access control device 18, for example, through a wireless communication signal between the guest device 14 and one or more of the control device 18, wireless device 47, or other device. In another approach, the credentials may be a code that the guest reads from the guest device 14 and enters into the control device 18 through a keypad, speech, or other interaction to affect entry to the secured premises 38.

If desired, the application can cause the access rights data to be stored in the memory 28 of the owner device 10. This information can be manually entered by the owner through the user input 22 of the owner device 10, by download from the access control device 18, by retrieving or receiving the access rights data from a network device, or the application can have a learn mode similar to a learning transmitter known in the art so that the owner device 10 receives and stores the information from a transmission of an authorized transmitter. Thus, if desired, the application can provide the owner with transmitter functionality to send an authorized control signal to the access control device 18 with the owner device 10. So configured, after the application has determined that the guest device 14 is within the access location area 48, the application can then check for previously granted access rights and any restrictions on the access rights, if applicable. If there are no restrictions, the application can then automatically prompt the guest for input on the display 32 of the guest device 14 and send the authorized control signal to operate the access control device 18 in response to selection of the user input 22. In this case, the application can further send a message, place a call, or otherwise contact the owner device 10 to notify the owner that the guest is being granted access to the secured premises 38.

Upon reception of the access rights data from the owner device 10, the application running on the guest device 14 can then configure the guest device 14 to send an authorized control signal to the access control device 18 to allow the guest to thereby operate the access control device 18. In one approach, the guest can instruct the application running on the guest device 14 to be receptive to the access rights data, such as in a learning mode, download the access rights data, such as from a third party server device, and/or store the access rights data in the memory 28. In another approach, the application can automatically store the access rights data in the memory 28 of the guest device 14. Then, when the guest desires to operate the access control device 18, the guest can run the application on the guest device 14, which can retrieve the access rights data and transmit an authorized control signal through the guest device transmitter 26 to the access control device 18, such as through Bluetooth, a cellular network, the internet, or the like.

Advantageously, the application can also be used by the owner to restrict usage of the access rights sent to the guest device 14. Specifically, the application can allow the owner to enter restrictions on the access rights granted to the guest device, including, temporal restrictions, spatial restrictions, or combinations thereof. For example, if the access control device 18 controls the locking and unlocking of a door 42, the restrictions can prevent the guest device 14 from being able to unlock the door 42 during specified times, such as specified hours of a day, one or more days during a week, or combinations thereof. In another example, if the premises 38 includes a series of locked doors, the restrictions can prevent the guest device 14 from being able to unlock specified doors so that the guest can only access selected areas of the premises 38.

The owner can input these restrictions or conditions into the application prior to the access rights data being sent to the guest device 14 so that the access rights data is sent with the restrictions to the guest device 14. As such, the application running on the guest device 14 can restrict transmission of an authorized signal or can transmit the signal along with the restrictions configured to be interpreted by the access control device 18 to permit or deny the requested action based on analysis of the restrictions. Alternatively or in addition thereto, the owner can subsequently modify already granted access rights by inputting the restrictions into the owner device 10 and sending the restrictions or causing the restrictions to be sent to the guest device 14 via the application to alter the authorized access rights stored on the guest device 14. By another approach, the owner device 10 can send the restrictions or conditions directly to the access control device 18. As such, the access control device 18 can access restrictions upon reception of a signal from the guest device 14 and permit or deny the requested action based on the restrictions. By yet another approach, the owner device 10 can input the restrictions or conditions at an intermediary server 16 or send the restrictions thereto. As such, the intermediary server 16 then controls the conditions placed on the authorization of the guest device 14 to send signals to the access control device. This is useful if the control signal from the guest device 14 is routed through the intermediary server 16.

So configured, upon instruction to send the authorized control signal to the access control device 18 with the user input 22 of the guest device 14, the application determines whether any restrictions on the access rights are applicable. If there are no restrictions applicable, the application can cause the transmitter 26 of the guest device 14 to transmit the authorized control signal to the access control device 18. Alternatively, the application can prevent sending of the control signal due to restrictions being applicable. For example, the application can display a grayed-out state, crossed-out, or the like. Additionally, the application can display the restrictions alongside or within the window of the secured premises 38.

By another approach, the access rights can be sent to the guest device 14 without any authorization for use. As such, the owner can subsequently send allowed or authorized spatial or temporal zones to the guest device 14 or intermediary server 16, or identify the allowed or authorized spatial or temporal zones for subsequent sending by a third party.

Of course, the application also allows the owner to revoke the access rights, such as by sending a revocation transmission to the application on the guest device 14 or to a third party server device or service, which would then deactivate or delete the access rights data from the guest device 14.

The various options for transmitting the access rights from the owner device 10 to the guest device 14 are described below with reference to FIGS. 4-9.

Figure 4:
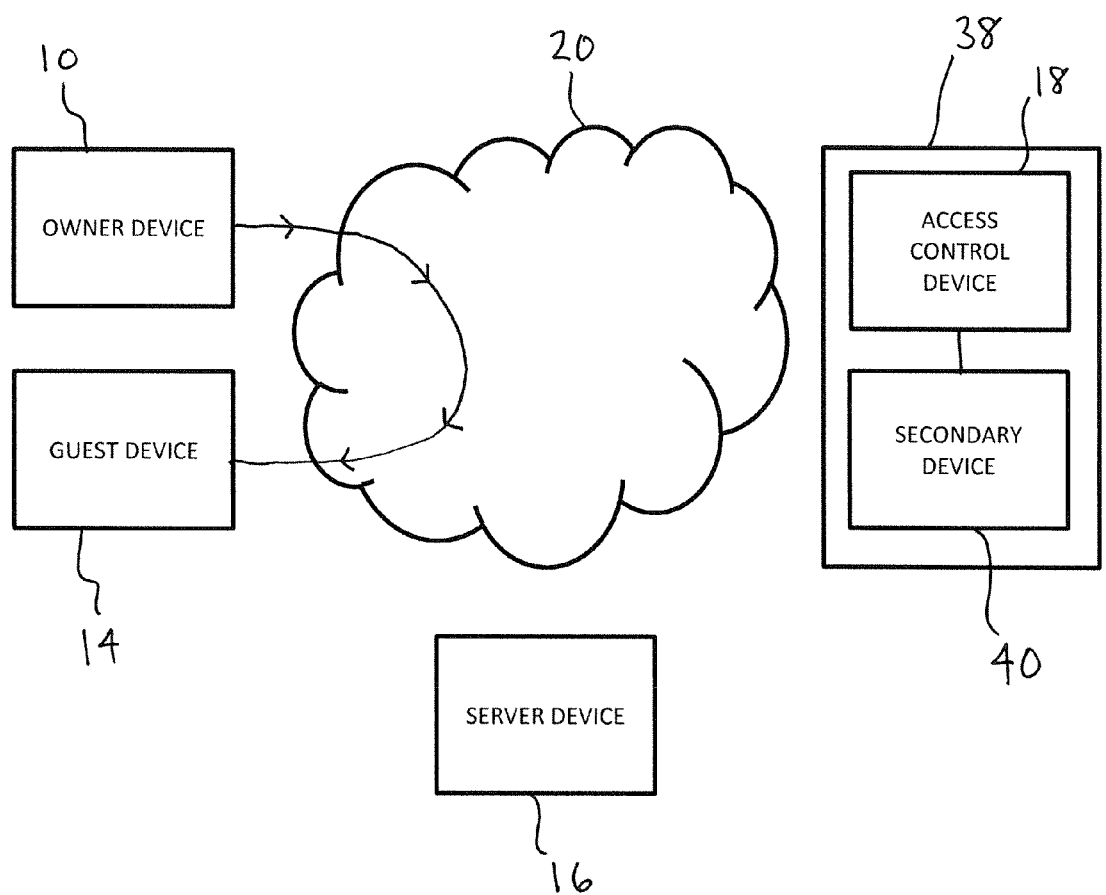
FIG. 4 is a schematic diagram showing communication to send access rights to a guest device from an owner device to the guest device.

In a first example, shown in FIG. 4, the owner device 10 communicates directly with the guest device 14 through the communication network 20, as discussed above. As such, the owner device 10 transmits the access rights data, with or without restrictions thereon as determined by the owner, directly to the guest device 14 by inputting identification information of the guest device 14, such as a telephone number, email address, IP address, SIM card, or the like into the owner device 10. The application then transmits the access rights data directly to the guest device 14.

Figure 5:
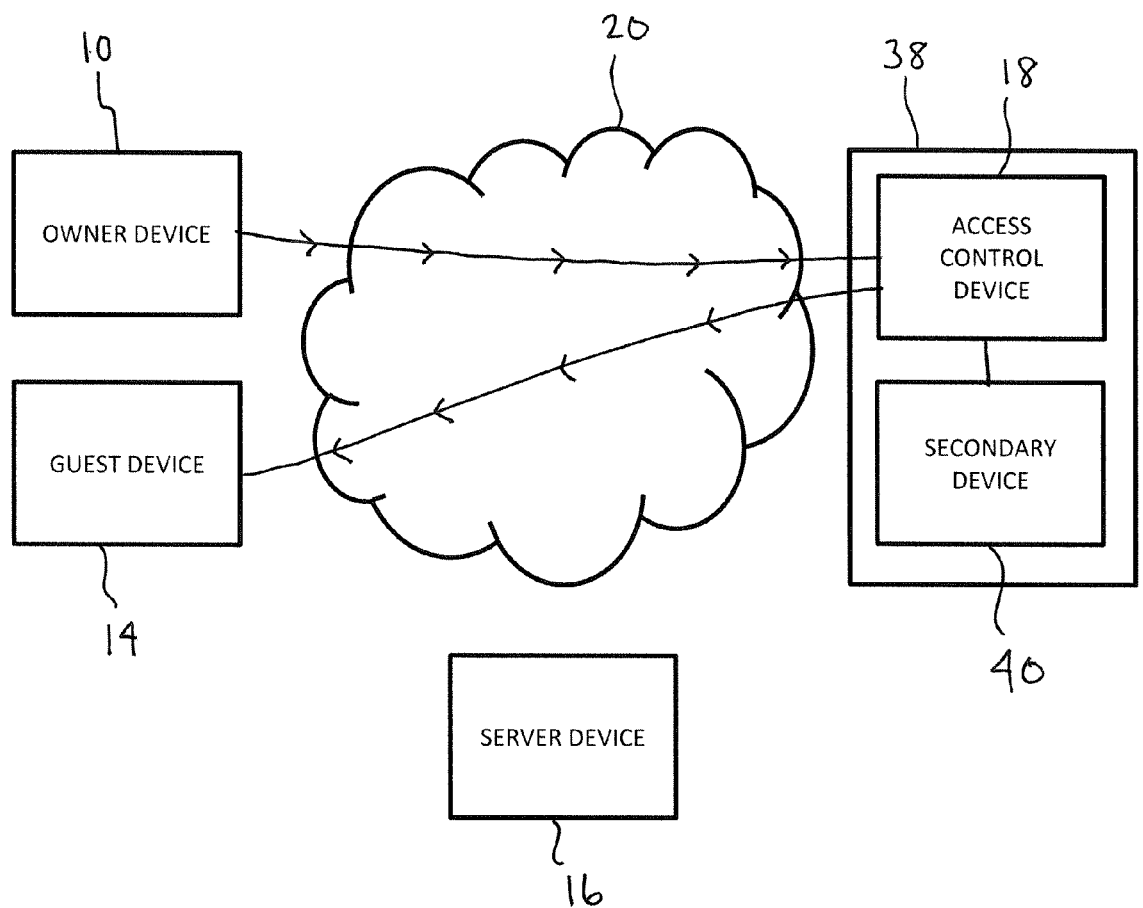
FIG. 5 is a schematic diagram showing communication to send access rights to a guest device from an owner device to an access control device to the guest device.

In another example, shown in FIG. 5, the owner device 10 transmits a request to the access control device 18 that the access control device 18 send the access rights data to the guest device 14. Upon reception of the request, the access control device 18 assumes the responsibility to send the access rights data to the guest device 14. The application on the owner device 10 can send the access rights data along with the request or the access control device 18 can send access rights data stored in its own system. The owner device 10 also transmits identification information of the guest device 14, so that the access control device 18 can identify the guest device 14 and transmit the access rights data or the application along with the access rights data to the guest device 14, similarly to that described above.

Figure 6:
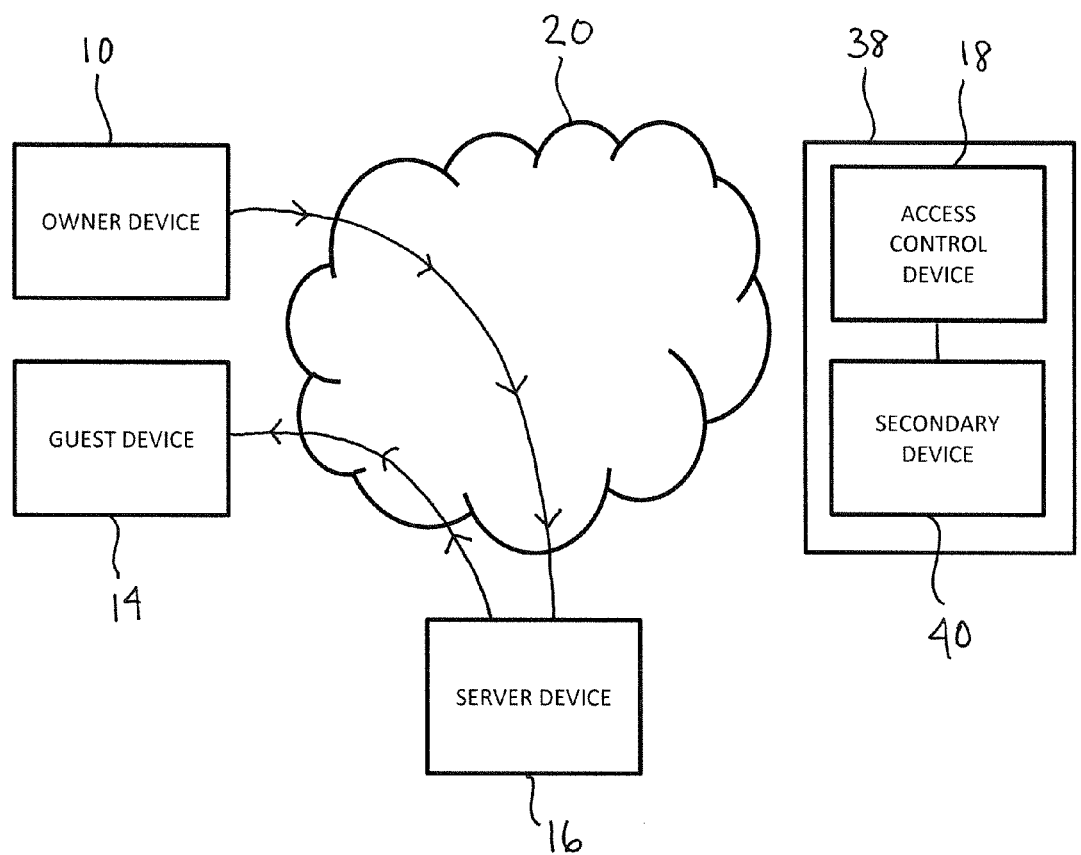
FIG. 6 is a schematic diagram showing communication to send access rights to a guest device from an owner device to a third party server device to the guest device.

Turning now to FIG. 6, in this example the intermediary server 16 can facilitate communication between the owner device 10 and the guest device 14. The intermediary device 16 can be a server device, either owned by one of the parties to the transaction or owned by a separate third party, such as an owner and distributor of the application, the access control device 18, or both. By one approach, the access control device 18 can have the application installed thereon so that the device 18 can easily operate within the parameters of the application running on the owner and guest devices 10, 14. The owner device 10 transmits the request to the intermediary server 16, which then assumes responsibility for transmitting the access rights data to the guest device 14. As with the example of FIG. 4, the access rights data can be sent by the owner device 10 or the intermediary server 16 can have the access rights data stored thereon or have access to the access rights data in a separate database. Upon reception of the request, the intermediary server 16 transmits the access rights data to the guest device 14.

Figure 7:
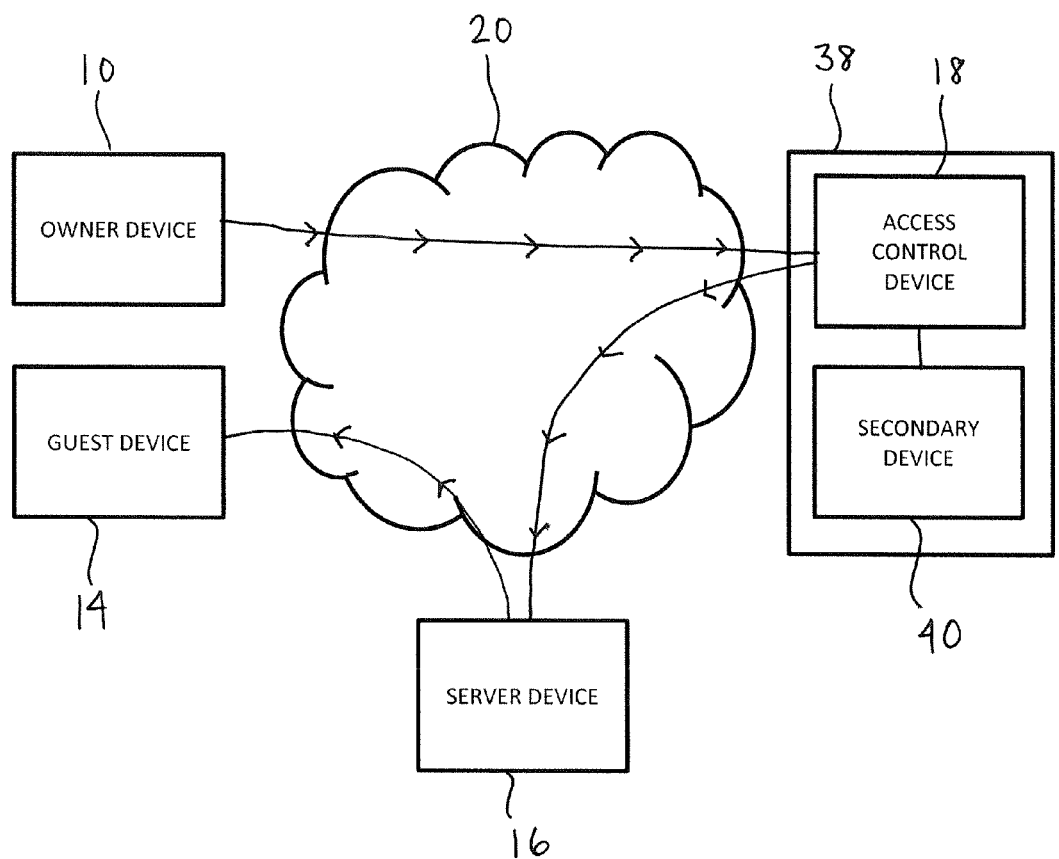
FIG. 7 is a schematic diagram showing communication to send access rights to a guest device from an owner device to an access control device to a third party server device to the guest device.
Figure 8:
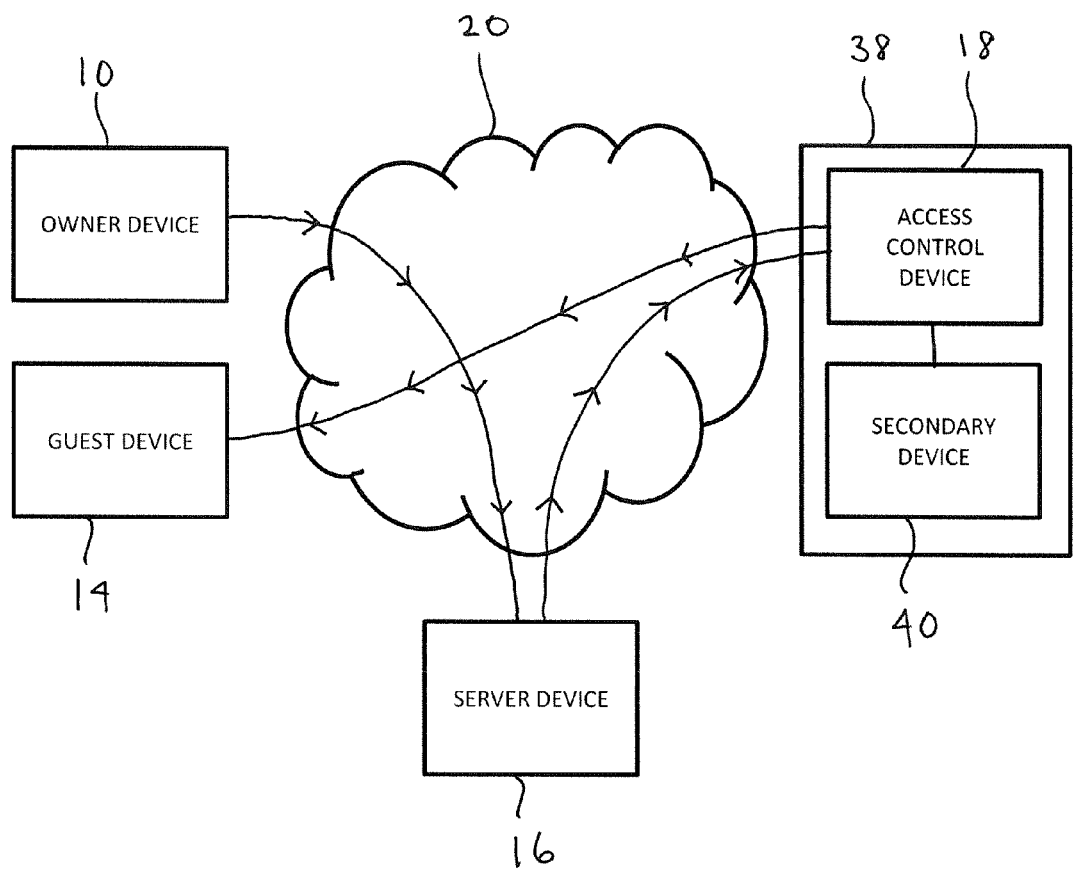
FIG. 8 is a schematic diagram showing communication to send access rights to a guest device from an owner device to a third party server device to an access control device to the guest device.

Other example communication configurations, as shown in FIGS. 7 and 8, include both the access control device 18 and the intermediary server 16. In a first approach of FIG. 7, the owner device 10 sends the request to the access control device 18, similar to that described above, then the access control device 18 forwards the request to the intermediary server 16. The intermediary server 16 assumes responsibility for sending the access rights data to the guest device 14. In a second approach of FIG. 8, the owner device 10 sends the request to the intermediary server 16, similar to that described above, then the intermediary server 16 forwards the request to the access control device 18. The access control device 18 assumes responsibility for sending the access rights data to the guest device 14. In either of these approaches, as discussed previously, the access rights data can be sent from any of the owner device 10, the access control device 18, or the intermediary server 16.

Figure 9:
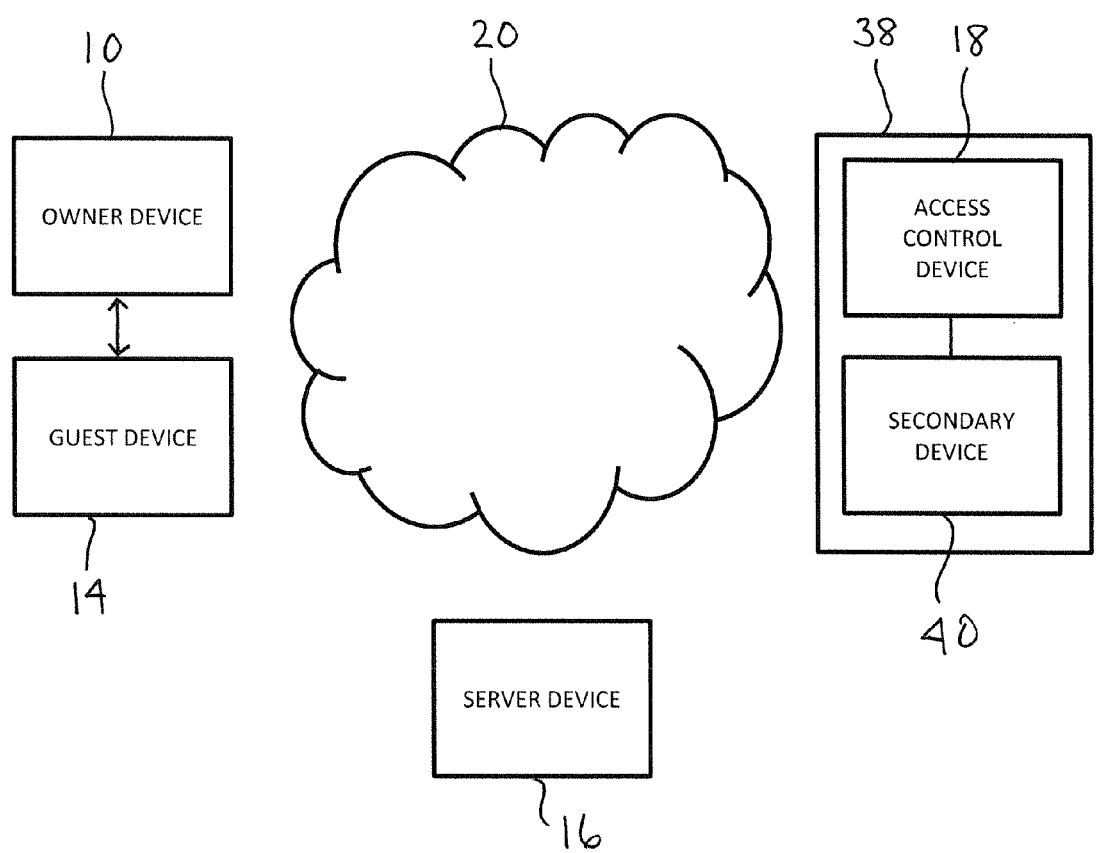
FIG. 9 is a schematic diagram showing communication to send access rights to a guest device from an owner device using near field communication.

By other approaches, as shown in FIG. 9, exchange of information, including the application and/or the access rights data, can utilize near field communication (NFC) between the owner and guest devices 10 and 14. In these approaches, the owner and guest bring their respective owner and guest devices 10 and 14 within short range, i.e., within about few inches, of one another to transmit information back and forth. The owner device 10 can initiate the NFC with the guest device 14 in order to transfer the access rights data to the guest device 14. In this approach, the owner device 10 can operate the application which utilizes NFC to initiate communication with the guest device 14 and transfer the access rights data thereto. The application running on the guest device 14 can further make it receptive to the NFC transmission from the owner device 10. By other approaches, the guest device 14 can initiate the NFC to request the various transmissions discussed above.

In all of the above communication examples, the application can include a self-test operation. Specifically, the self-test operation can cause the guest device 14, upon reception of the access rights data, to send a test control signal to the access control device 18. The self-test operation can either do this automatically upon reception and storage, can require the application to transmit the test control signal within a specified time, or can require the application to transmit the test control signal prior to a first use. The test signal can result in the access control device 18 transmitting a confirmation signal in response to the test signal, which can be routed through the intermediary server 16. The confirmation signal can be transmitted to the guest device 14 and/or the owner device 10, as desired. Alternatively, operation of access control device 18 by the guest device 14 can confirm to both the owner and guest that the transmission of the access rights data was successful.

In some instances, the owner may want to create a list of guests that have been granted access or can be pre-screened to be granted access. As such, the application can provide a functionality for the owner to indicate whether the access rights sent to the guest device 14 should be permanently stored on the guest device 14 or permanently accessible by the guest device 14. The guest list can identify the allowed guests by name, telephone number, or other suitable identification information. Of course, the application can also provide editing functionalities to the owner so that the owner can edit the restrictions placed on the access rights of particular guests, remove guests, or add new guests. If desired, the application can prompt the owner to indicate whether a guest that has been granted access to the secured premises 38 should be added to the guest list.

Alternatively, for other instances requiring lower security, the guest list can be public, and guests can sign up through the application or via a website. As such, the guest inputs identification information and guest device identification information and, in response, the application operating on the guest device is granted access to the access rights data, which can be stored on a server device or the like. The public list can further include a functionality for an owner or administrator to remove or block specific guests and/or guest devices via their identification information.

Advantageously, the location determination can be used by applications of recognized guests for automatic entry. More specifically, after the application determines that the guest device 14 is within the access location area 48 in any of the ways discussed above, the application can then check for previously granted access rights and any restrictions on the access rights, if applicable. If there are no restrictions, the application can then automatically send the authorized control signal to operate the access control device 18 without further input from the guest. In this case, the application can further send a message, place a call, or otherwise contact the owner device 10 to notify the owner that the guest is being granted access to the secured premises 38.

Turning now to examples of operation of the interaction between the guest device 14 and the access control device 18 after the guest device 14 successfully receives the access rights data from the owner device 10, as shown in FIGS. 10-14.

Figure 10:
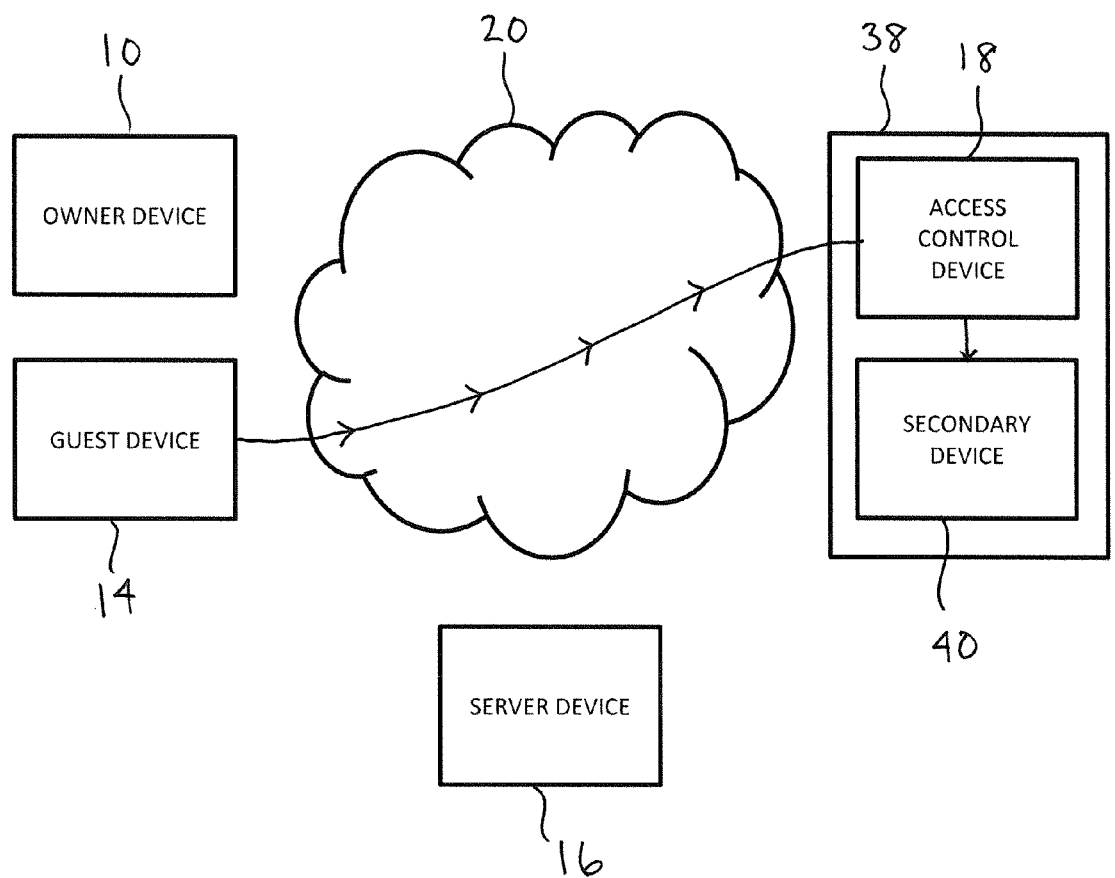
FIG. 10 is a schematic diagram showing communication to grant a guest device access to an access control device from the guest device to the access control device.

In the most straightforward example, as shown in FIG. 10, the guest runs and operates the application on the guest device 14 to send an authorized control signal directly to the access control device 18 identified in the access rights data through a communication network 20. The authorized control signal identifies a desired action to be performed at the access control device 18. The access control device 18, upon reception and verification of the credentials of the control signal from the guest device 14, then causes the desired action at the secondary devices 40, either by performing the action in the integral example or by translation of the control signal to a device specific language and sending the control signal to the separate secondary device 40.

Figure 11:
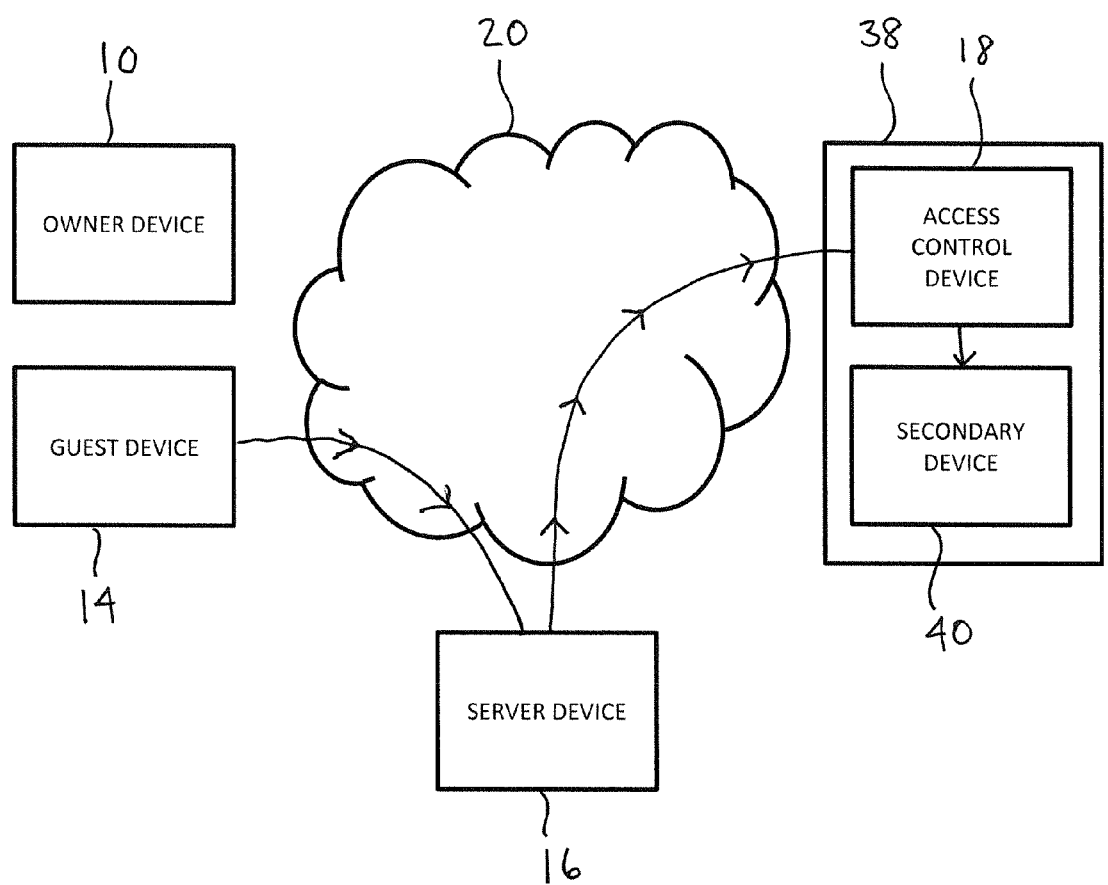
FIG. 11 is a schematic diagram showing communication to grant a guest device access to an access control device from the guest device to a third party server device to the access control device.

In another example, as shown in FIG. 11, the intermediary server 16 can act as a relay for the authorized control signal from the guest device 14. In this example, the application operating on the guest device 14 causes the control signal to be transmitted to the intermediary server 16 through the communication network 20, which then forwards the control signal to the access control device 18 identified by the application. If desired, the intermediary server 16 can log each control signal sent from the guest device 14. This is particularly advantageous in a situation where guest access control is purchased by the guest. The server logging each time a control signal is received from guest device 14 can allow the owner to charge for each control usage. By another approach, the owner can configure or request the intermediary server 16 to deny access control rights to an identified guest device 14 at times chosen by the owner. This is advantageous in an example where a guest prepays for access control and the guest does not have a sufficient balance, or the guest has a balance due.

Figure 12:
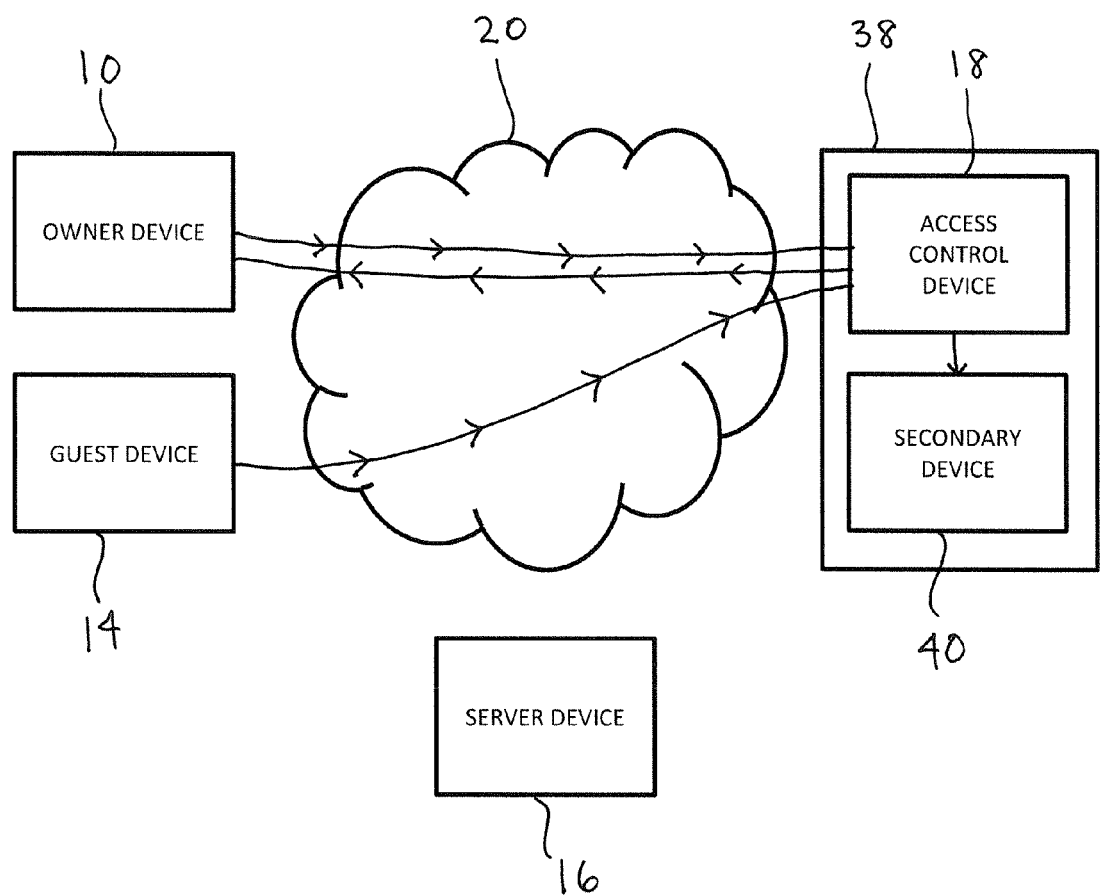
FIG. 12 is a schematic diagram showing communication to grant a guest device access to an access control device from the guest device to the access control device, and the access control device confirming authorization of the guest device with an owner device.
Figure 13:
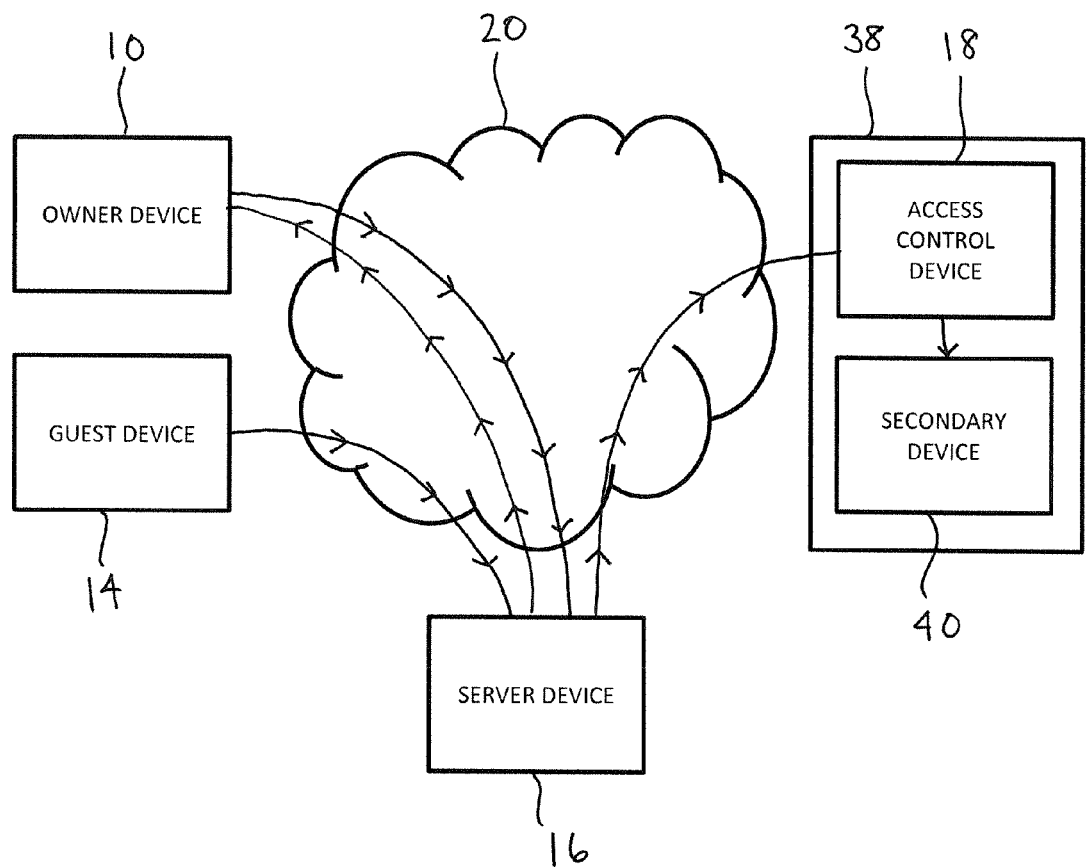
FIG. 13 is a schematic diagram showing communication to grant a guest device access to an access control device from the guest device to a third party device, the third party server device confirming authorization of the guest device with an owner device, and the third party communicating with the access control device.
Figure 14:
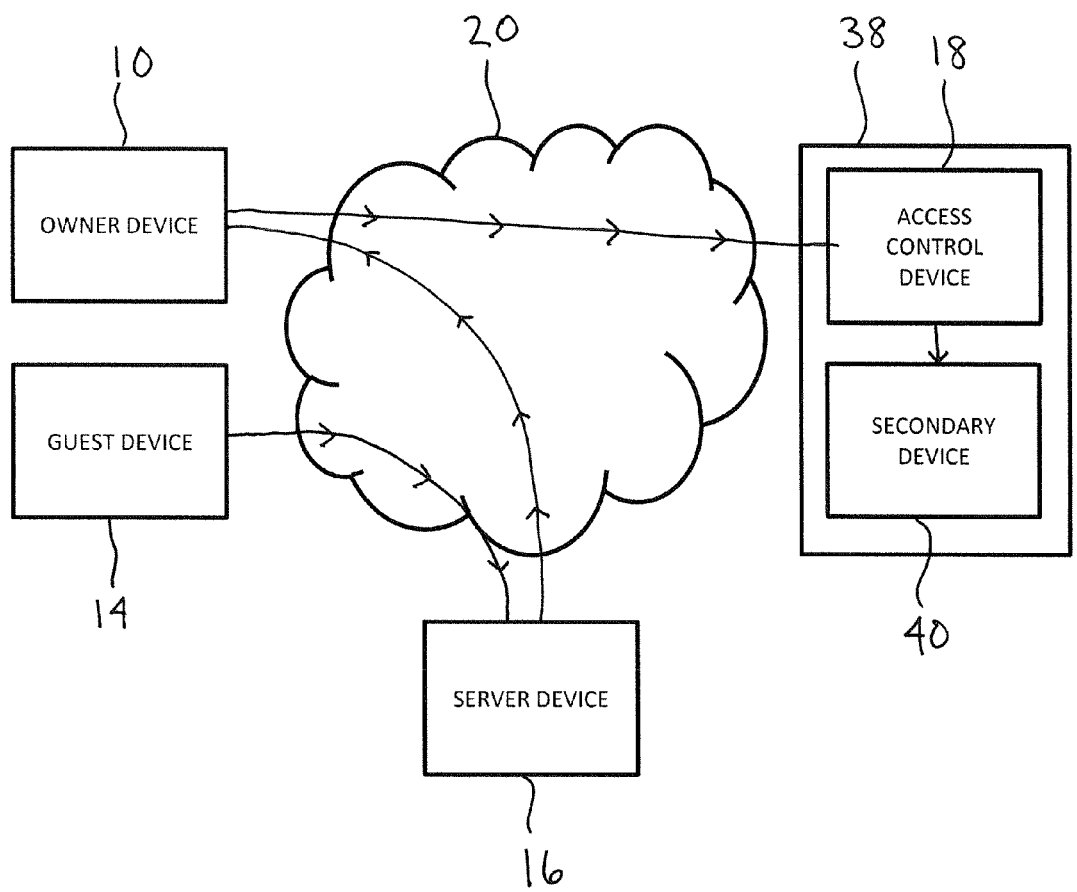
FIG. 14 is a schematic diagram showing communication to grant a guest device access to an access control device from the guest device to a third party server device, the third party server device confirming authorization of the guest device with an owner device, and the owner device communicating with the access control device.

In the examples shown in FIGS. 12-14, the owner device 10 is requested to confirm each attempt of the guest device 14 to send a control signal to the access control device 18. In a first example of FIG. 12, the guest device 14 transmits an authorized control signal to the access control device 18, similar to the operation discussed with respect to FIG. 10. Instead of directly passing the control signal to the identified secondary device 40, however, the access control device 18 instead transmits a confirmation request signal or message to the owner device 10. The confirmation request signal allows an owner to admit or deny the request of the guest device 14. For example, the application can display an interface with "admit" and "deny" access control options for the owner to select. If the owner denies access, the application identifies the decision and transmits a denial signal or message to the access control device 18, which then denies access to the guest device 14 and does not cause the requested action to be performed. The access control device 18 can also send a denial confirmation signal or message to the guest device 14 to inform the guest of the owner's decision. If the owner allows access, the application identifies the decision and transmits an allow signal or message to the access control device 18, which then performs the requested action at the secondary device 40 or translates the control signal and passes the signal onto the identified secondary device 40 to perform the requested action.

In a second example of FIG. 13, the guest device 14 transmits an authorized control signal to the intermediary server 16, similar to the operation discussed with respect to FIG. 11. Instead of passing the control signal to the access control device 18, however, the intermediary server 16 instead routes the guest's requested control signal or message to the owner device 10. This allows the owner to admit or deny the guest access. If the owner denies access, the application identifies the decision and transmits a denial signal or message to the intermediary server 16, which then refuses to forward the control signal onto the access control device 18. The intermediary server 16 can also send a denial confirmation signal or message to the guest device 14 to inform the guest of the owner's decision. If the owner allows access, the application identifies the decision and transmits an allow signal or message to the intermediary server 16, which then forwards the guest's control signal to the access control device 18. As discussed above, the access control device 18 then performs the requested action at the secondary device 40 or translates the control signal and passes the signal onto the identified secondary device 40 to perform the requested action.

In another example of FIG. 14, the guest device 14 transmits an authorized control signal to the intermediary server 16. Instead of passing the control signal to the access control device 18, however, the intermediary server 16 instead routes the guest's requested control signal or message to the owner device 10, similar to the operation discussed with respect to FIG. 13. In this example, however, the owner is given the task of forwarding the control signal to the access control device 18. This provides an alternative method for the owner to admit or deny the guest access. If the owner denies access, the application can simply not forward the control signal to the access control device 18. If desired, the application can also transmits a denial signal or message back to the intermediary server 16, which can then send the denial message to the guest device 14 to inform the guest of the owner's decision, or to the guest device 14 directly. If the owner allows access, the application identifies the decision and forwards the guest's control signal to the access control device 18. As discussed above, the access control device 18 then performs the requested action at the secondary device 40 or translates the control signal and passes the signal onto the identified secondary device 40 to perform the requested action.

Depending on the size of the access location area 48 and/or the area surrounding the access point 42, it may be difficult to actually find the access point 42. If desired, the application can help direct a guest to the access point 42. More specifically, the application can retrieve or receive a location of the access point 42 stored on a server device or requested from the owner device 10. Then, utilizing GPS circuitry 34 in the guest device 14, the application can display the location of the access point 42 and, optionally, provide a route for finding the access point 42. This is particularly helpful in a setting where there are several visible doors to gain access to the secured premises 38, but only one can be operated by the application.

In alternative forms, access codes utilizing a keypad or the like can be used in place of the authorized control signal discussed above. In this case, the owner device 10 instructs the application to send an access code to the guest device 14 after confirming the identity of the guest and the guest can then enter the access code to gain entry to the secured premises 38. If desired, the application can operate in conjunction with the access control device 18 to create access codes specific to individual ones of the guest devices 14. As such, the restrictions discussed above can be applied to the specific access codes as desired by the owner. Moreover, if the owner decides to rescind access rights to the guest, the owner can instruct the application to remove the access rights so that the access control device 18 will no longer recognize the rescinded access code.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. For example, in an alternative form, a website, identified by any of the methods described above, can be configured to operate similar to the application as described herein. The actual scope of the protection sought is intended to be defined in the following claims when viewed in their proper perspective based on the prior art.

What is claimed is:

1. A method comprising:
   accessing an application or website on a wireless device for being granted access to a secured premises;
   determining a location with the wireless device;
   determining whether the location of the wireless device is within a predetermined area surrounding an access control device;
   receiving identification information for one or more contacts having control over the secured premises;
   receiving a selection of the identification information of one of the contacts to gain access to the secured premises via operation of the access control device.

2. The method of claim 1 wherein accessing the application or website comprises scanning a machine-readable code.

3. The method of claim 2 wherein scanning the machine-readable code identifies a web address.

4. The method of claim 2 wherein scanning the machine-readable code identifies an application.

5. The method of claim 1 wherein accessing the application or website comprises joining a Wi-Fi network, the Wi-Fi network directing the wireless device to the website.

6. The method of claim 1 wherein determining the location with the wireless device comprises utilizing a global positioning functionality of the wireless device.

7. The method of claim 1 wherein determining the location with the wireless device comprises connecting to a wireless signal broadcast by the access control device in a predetermined area surrounding the access control device.

8. The method of claim 1 wherein receiving the identification information for the one or more contacts comprises contact information for the one or more contacts.

9. The method of claim 8 wherein the contact information is encrypted.

10. The method of claim 8 wherein the contact information utilizes push notification.

11. The method of claim 1 further comprising receiving guest identification information from an input of the wireless device; and sending the guest identification information to the selected contact to gain access to the secured premises.

12. The method of claim 11 further comprising receiving an access code in response to sending the guest identification information.

13. The method of claim 11 wherein receiving the access code comprises receiving an access code subject to temporal restrictions.

14. The method of claim 1 wherein receiving the selection of the identification information of the one of the contacts comprises receiving a selection of the identification information of one of the contacts to gain access to the secured premises via operation of the access control device controlled by a device of the one of the contacts.

15. The method of claim 11 further comprising receiving credentials for operating the access control device in response to sending the guest identification information.

16. The method of claim 15 further comprising sending a control signal including the credentials to operate the access control device.

17. The method of claim 1 further comprising receiving directional information to an access point to the secured premises.

18. The method of claim 1 further comprising automatically sending the guest information in response to previously being granted access to the secured premises.

19. A method comprising:
   running an application on an owner wireless device;
   receiving guest identification information from a guest wireless device requesting access to a secured premises;
   receiving a confirmation that the guest wireless device is within a predetermined area surrounding an access control device;
   receiving a confirmation to grant access based on the guest identification information from a user input of the owner wireless device.

20. The method of claim 19 wherein receiving the guest identification information comprises receiving a push notification through the application.

21. The method of claim 19 further comprising sending credentials for operating the access control device to the guest wireless device in response to receiving the confirmation.

22. The method of claim 21 wherein the credentials are temporally restricted.

23. The method of claim 19 further comprising sending a control signal to the access control device in response to receiving the confirmation.

24. The method of claim 19 further comprising saving the guest identification information in an approved guest list.

25. The method of claim 24 further comprising automatically granting access to a guest wireless device having guest identification information in the approved guest list.

26. The method of claim 24 further comprising receiving a command to remove guest identification information from the approved guest list from an input of the owner wireless device.

* * * * *